United States Patent [19]
Tobuse et al.

[11] Patent Number: 5,403,989
[45] Date of Patent: Apr. 4, 1995

[54] METHOD AND APPARATUS FOR REMOVING FOREIGN MATTERS FROM A CATHODE-RAY TUBE

[75] Inventors: Hiroaki Tobuse; Tomoyuki Kanda; Yasusi Hisaoka; Shigeo Sasaki; Minoru Kobayashi; Takuji Oda; Ryuji Ueda, all of Amagasaki; Akio Yoshida, Tokyo; Tadayoshi Owaki, Nagaokakyo; Akihiko Yamasaki, Nagaokakyo; Masaaki Kinoshita, Nagaokakyo; Toshiaki Fukunishi, Nagaokakyo, all of Japan

[73] Assignee: Mitsubishi Denki Kabushiki Kaisha, Tokyo, Japan

[21] Appl. No.: 36,399

[22] Filed: Mar. 24, 1993

[30] Foreign Application Priority Data

Mar. 25, 1992 [JP] Japan ................. 4-067097
Jan. 22, 1993 [JP] Japan ................. 5-009114

[51] Int. Cl.⁶ ............................................. B23K 15/00
[52] U.S. Cl. ........................... 219/121.2; 219/121.19
[58] Field of Search ............... 219/121.19, 121.20, 219/121.68, 121.69

[56] References Cited

FOREIGN PATENT DOCUMENTS 56-35343  4/1981  Japan .

Primary Examiner—C. L. Albritton

[57] ABSTRACT

In a color cathode-ray tube, only a foreign matter adhering to a shadow mask is removed effectively without thermal deformation of the shadow mask or thermal denaturation of phosphors.

An electron beam produced by an electron gun incorporated in a cathode-ray tube itself is scanned or irradiated to all over a shadow mask of the color cathode-ray tube. The radiant state of a fluorescent screen at this stage is checked to detect a foreign matter adhering to the shadow mask. The electron beam is deflected to align with the position at which the foreign matter is detected, and then irradiated to the foreign matter in the form of pulses. Thus, the foreign matter is heated and removed.

9 Claims, 19 Drawing Sheets

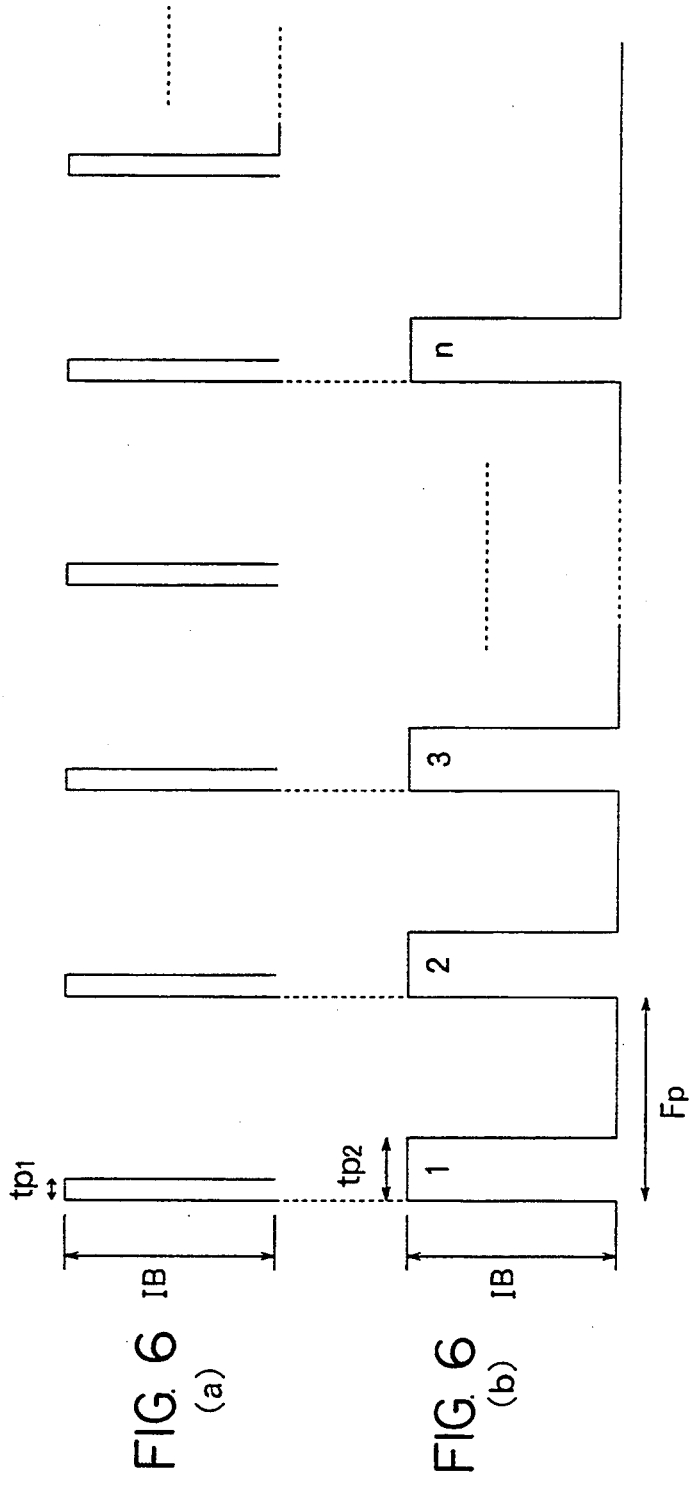

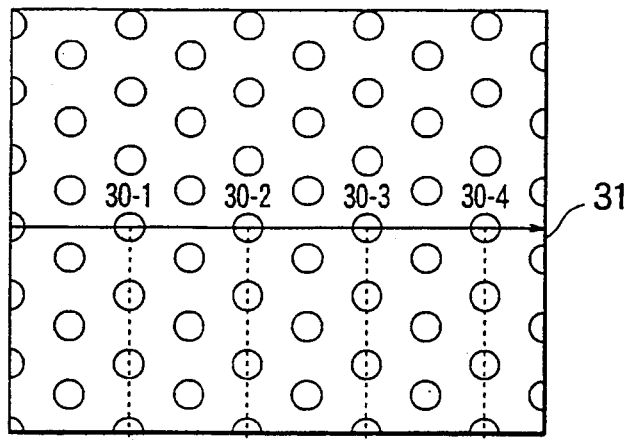

$Jc \cdot Jp = Jp \cdot Tp \times N$

Jc, Jp BEAM CURRENT DENSITY

| MEMORY ADDRESS | CONTENTS OF DATA IN THE FIRST MEMORY 70 | CONTENTS OF DATA IN THE SECOND MEMORY 71 |
|---|---|---|
| 0 | 0 | 0 |
| 1 | $DX_1$ | $DY_1$ |
| 2 | $DX_2$ | $DY_2$ |
| ⋮ | ⋮ | ⋮ |
| N | $DX_N$ | $DY_N$ |

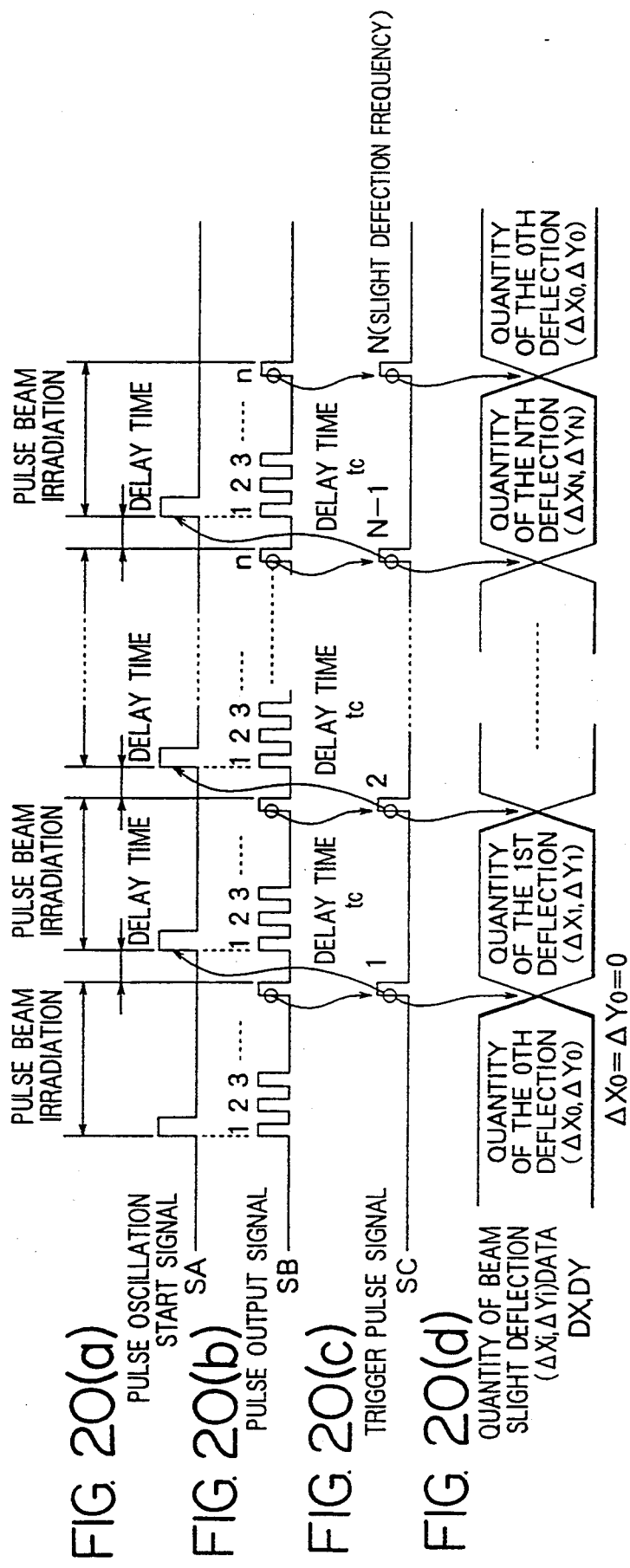

METHOD AND APPARATUS FOR REMOVING FOREIGN MATTERS FROM A CATHODE-RAY TUBE

BACKGROUND OF THE INVENTION

1. Field of the Invention

The present invention relates to a method and an apparatus for removing foreign matters, which have adhered to a shadow mask during manufacturing of a cathode-ray tube such as a color cathode-ray tube, using an electron gun of the cathode-ray tube itself.

2. Description of the Prior Art

When a foreign matter adheres to a shadow mask, an area corresponding to the foreign matter on a screen appears as a black dot in a raster or areas with other colors radiate. Great care is, therefore, taken in the process of manufacturing so as not to allow foreign matters to adhere.

When a color cathode-ray tube, for example, is concerned, after a shadow mask is attached to a face panel, the face panel is fused with a funnel using a low-fusion point glass in order to achieve evacuation lock.

Since an effective method for removing foreign matters, which have adhered to the shadow mask, after an evacuation lock process has not been devised, defectives sometimes occur.

As a countermeasure against the foregoing drawback, a method for removing foreign matters by applying mechanical vibrations has been adopted as a method for removing foreign matters, which have adhered to a shadow mask, after the evacuation lock process. Similar methods are disclosed in, for example, Japanese Unexamined Patent Publications (Kokai) Nos. 50-105267, 54-152858, 55-136439, 59-16246, and 62-69435.

Japanese Unexamined Patent Publication No. 56-35343 has disclosed a method for removing foreign matters, which have adhered to a shadow mask, using an electron beam generated by a cathode-ray tube itself after the evacuation lock process is complete. According to this method, a deflection circuit in a cathode-ray tube is switched from a raster deflection circuit to a dc deflection circuit in order to produce a spot-like electron beam. The electron beam is aligned with a foreign matter, and a specified beam current is irradiated to the foreign matter continuously for a specified period of time in order to remove the foreign matter. The use of an electron beam generated by a TV cathode-ray tube enables dissolution and removal of an average-size foreign matter for about three minutes.

Among the aforesaid conventional methods for removing foreign matters, a method of applying mechanical vibrations is effective for foreign matters whose adhesions are very weak. In practice, many foreign matters are, however, adhering to a shadow mask persistently or in a fused state, and cannot be removed merely by applying slight vibrations to the shadow mask. Strong vibrations may deform the shadow mask.

In a method of using an electron beam generated by a cathode-ray tube itself, a foreign matter is fused and removed by irradiating a specified quantity of beam current to the foreign matter continuously for a specified period of time. While an electron beam is being irradiated, therefore, the portion of a mask in the vicinity of a foreign matter is also irradiated continuously for the specified period of time.

In a display monitor tube, for example, the diameter of a hole on a shadow mask is about 120 micrometers, and the hole pitch is about 300 micrometers. The size of a foreign matter usually ranges from 100 to 200 micrometers. The diameter of a convergent beam ranges from 500 to 600 micrometers on a tube surface. Assuming that the density distribution of beam current on a mask is a Gaussian distribution and that a 30 value represents a radius of a beam (250 to 300 $\mu$m) on the tube surface, energy applied to a foreign matter is at most 10% of all energy. This means that in an actual cathode-ray tube, almost all the beam irradiation energy passes a mask and holes on the mask and enters phosphors.

In the foregoing continuous irradiation method, therefore, a majority of a electron beam passes through the holes on a mask and irradiates not only the mask but also a fluorescent screen at an area in which no space is present between a mask hole and foreign matter or no foreign matter is present. Consequently, the phosphors themselves are heated for a specified period of time.

Continuous heating of a shadow mask resulting from irradiation of beam current during foreign matter removal brings about a temperature rise accompanied by the local thermal deformation of the mask. This causes a relative distance between an electron gun and the mask to change, which results in color misregistration on a screen. Continuous irradiation of a phosphor with an excess quantity of beam current brings about the local thermal damage to the phosphor, which deteriorates the brightness of the phosphor. This results in a defect on a screen.

In an experiment the present inventor conducted using a cathode-ray tube actually, the diameter of an electron beam was reduced to about 700 $\mu$m on a tube surface and the electron beam was irradiated for 10 sec with varying beam currents. As a result, it was found that when the quantity of beam current is 40 $\mu$A or less, thermally adverse effects are not placed on a mask, but that when the quantity exceeds 50 $\mu$A, the mask deforms to cause adverse effects such as color misregistration.

As described above, in a conventional method for removing foreign matters by irradiating an electron beam continuously for a specified period of time, a quantity of beam current per unit area or unit time must be restricted so as not to cause thermal deformation of a mask or thermal damage to phosphors. From a viewpoint of a material property, foreign matters having low fusion points and low sublimation points are removed effectively. Foreign matters having high fusion points and high sublimation points are, however, removed quite ineffectively.

An experimental attempt was made to remove foreign matters using an actual cathode-ray tube under the parameters for continuous beam irradiation that will not cause the aforesaid thermal deformation of a mask. Thereafter, a tube was disassembled and foreign matters which had hardly been removed were analyzed using an electron microbeam analysis (EMPA). As a result, it was confirmed that the materials which had hardly been removed were high-fusion point materials; such as, a graphite conducting material with which the inside of a funnel is coated to hold an anode button and a mask in mutual conduction, glasses, and irons.

SUMMARY OF THE INVENTION

The present invention attempts to solve the aforesaid problems. An object of the present invention is to provide a method and an apparatus for removing foreign matters from a cathode-ray tube that can effectively remove not only foreign matters having low fusion points and low sublimation points but also those having high fusion points and high sublimation points, which have adhered to a mask, using an electron beam generated by the cathode-ray tube itself without causing thermal deformation of a mask or thermal damage to phosphors after an evacuation lock process for a cathode-ray tube is complete.

A method for removing foreign matters from a cathode-ray tube according to the present invention is characterized by the procedure that: while an electron gun of a cathode-ray tube itself is scanning an electron beam all over a shadow mask of the cathode-ray tube, the radiant state of a fluorescent screen is observed from outside the cathode-ray tube; the observation data is analyzed to detect the presence or absence, and position of a foreign matter adhering to the shadow mask; a spot-like electron beam is deflected to align with the foreign matter; and then the electron beam is irradiated intermittently in order to remove the foreign matter.

An apparatus for removing foreign matters from a cathode-ray tube according to the present invention is characterized by comprising a means for scanning an electron beam over a tube surface to produce a raster, a means for detecting the position of a foreign matter adhering to a shadow mask by checking the radiant state of a fluorescent screen on the tube surface, a means for converging an electron beam spot to a specified diameter, a means for adjusting the position to which the electron beam spot is deflected, a means for turning on or off the electron beam so as to achieve intermittent irradiation, and a means for inching the intermittent irradiation point of an electron beam discretely.

In the first invention an electron beam with a high current density is irradiated intermittently to a foreign matter, whereby only the foreign matter is instantaneously heated to be a high temperature, sublimated, burnt up or dissolved and evaporated, and then removed without damage to phosphors or thermal deformation of a shadow mask.

In the second invention, the size of a radiant area of an electron beam is held constant during alignment, whereby the beam current density is held constant, and the electron beam is inched with a foreign matter as a center. Consequently, even a large foreign matter can be removed.

BRIEF DESCRIPTION OF THE DRAWINGS

FIGS. 6a and 6b are charts for comparing the parameters for irradiation pulses for alignment of an electron beam with a foreign matter with the parameters for pulse output for foreign matter removal according to Embodiment 1 of the present invention;

FIGS. 7a to 7c include explanatory diagrams concerning the measurement of brightness of phosphors after foreign matter removal in Embodiment 1 of the present invention;

FIGS. 20a to 20d are an explanatory diagram of operational timing in the apparatus of Embodiment 5 of the present invention.

DESCRIPTION OF THE PREFERRED EMBODIMENTS

Figure 1:
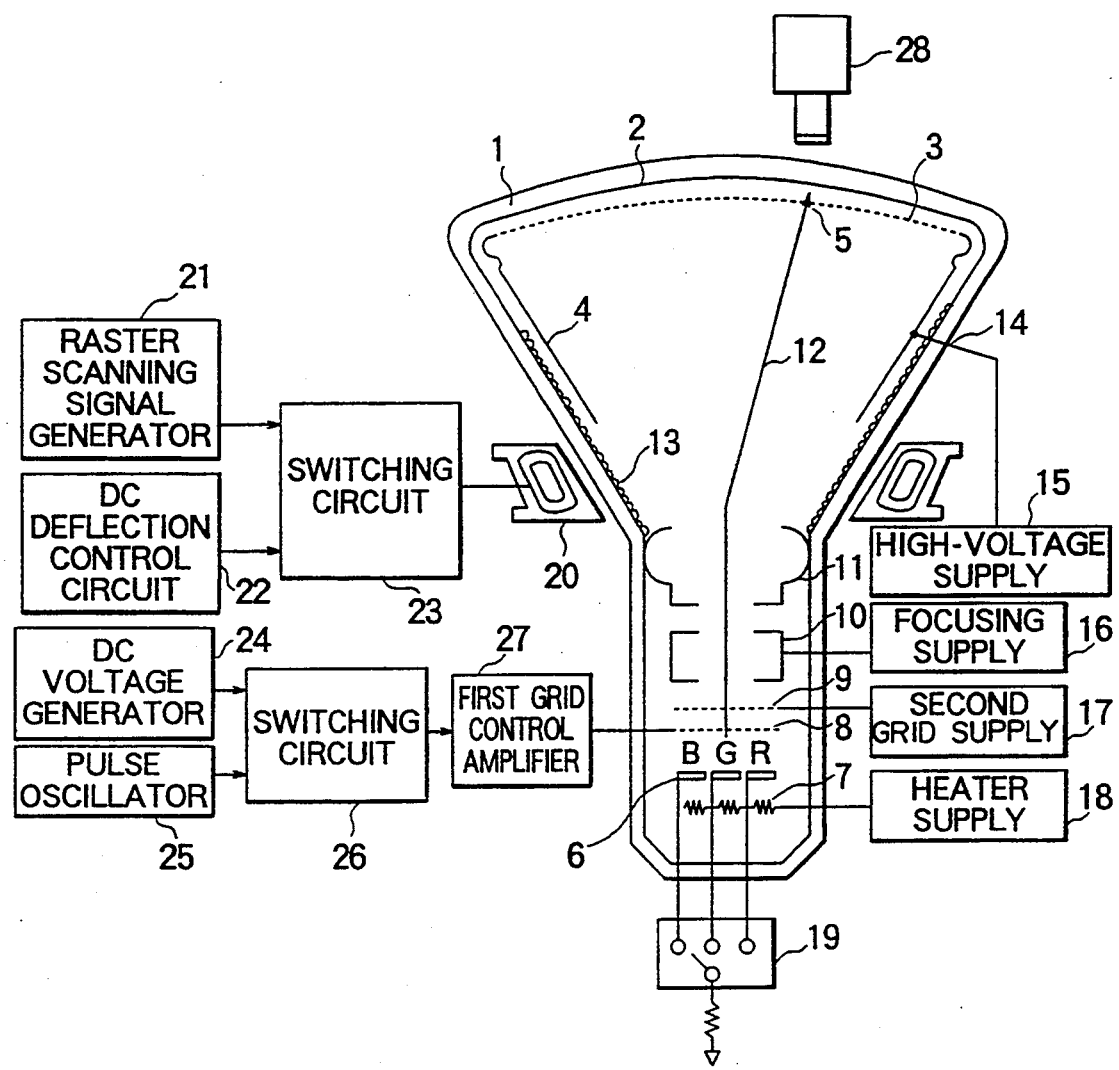
FIG. 1 is a constructional diagram of an apparatus representing Embodiment 1 of the present invention.

FIG. 1 is a constructional diagram, showing a method and an apparatus for removing foreign matters from a cathode-ray tube according to the present invention. In this Embodiment 1, foreign matters, which have adhered to a shadow mask of a cathode-ray tube or a color cathode-ray tube, are removed using a monochrome electron beam generated by tile color cathode-ray tube itself.

In FIG. 1, 1 denotes a face panel of the color cathode-ray tube. 2 denotes a fluorescent screen formed on the inner surface of the face panel 1. 3 denotes a shadow mask attached to the inside of the face panel. 4 denotes an internal magnetic shield plate coupled with the shadow mask 3. 5 denotes a foreign matter consisting of glasses or organic matters and adhering to the shadow mask 3.

An electron gun includes cathodes 6 associated with red (R), green (G), and blue (B), and heaters 7 for heating the cathodes 6 so as to generate thermoelectrons. In front of the cathodes 6, first and second grid electrodes 8 and 9 for controlling beam current drawn out of the cathodes 6, a focusing electrode 10 for converging electrons which have passed through the second grid electrode 9, and an accelerating electrode 11 for accelerating the converged electrons and irradiating the electrons to the shadow mask 3 are arranged in that order.

12 denotes an electron beam irradiated to the shadow mask 3. 13 denotes an internal conducting film. The internal conducting film 13 is held in conduction with the shadow mask 3, the internal magnetic shield plate 4, and the accelerating electrode 11. The internal conducting film 13 is further connected to a high-voltage supply 15 (normal voltage+24 kV to +27 kV).

The cathodes 6 are connected to a cathode switching circuit 19. The heaters 7 are connected to a heater supply 18. The second grid electrode 9 is connected to the second grid supply 17. The focusing electrode 10 is connected to a focusing supply 16.

20 denotes a deflection coil that deflects the electron beam 12, which is connected to a raster scanning signal circuit 21 and to a dc deflection control circuit 22 via a switching circuit 23. The first grid electrode 8 is connected to a dc voltage generator 24 and to a pulse oscillator 25 via a switching circuit 26 and a first grid control amplifier 27.

28 denotes an ITV camera for observing the fluorescent screen 2 from outside the cathode-ray tube.

Next, a series of operations for removing the foreign matter 5 adhering to the shadow mask 3 will be described.

Operation for detecting the foreign matter 5 adhering to the shadow mask 3

First, the cathode switching circuit 19 selects the cathode 6 associated with, for example, green G. The switching circuit 23 selects the raster scanning signal circuit 21 so as to actuate the deflection coil 20. The switching circuit 26 selects the dc voltage generator 24, whereby a specified (negative) voltage is applied to the first grid electrode 8 via the first grid control amplifier 27. Consequently, a monochrome (green) electron beam 12 is produced, which scans the whole surface of the shadow mask to produce a raster. Then, the radiant state of the fluorescent screen 2 is monitored from outside the face panel 1.

When the foreign matter 5 is adhering to the shadow mask 3, the portion of a screen corresponding to the foreign matter is visualized as a black dot. This is attributable to the fact that the phosphors coated on the portion do not give off light because the electron beam 12 is shut out by the foreign matter 5 and not irradiated to the fluorescent screen. The ITV camera 28 is used to produce an enlarged image of the position of the black dot with the field of view thereof set at the position of the black dot. The enlarged image looks like FIG. 2.

Figure 2:
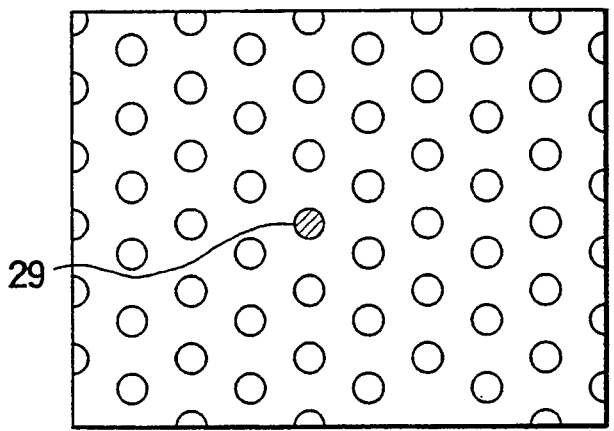
FIG. 2 is an enlarged view of a fluorescent screen during foreign matter detection according to Embodiment 1 of the present invention.

In FIG. 2, white circles represent green phosphors that are radiating. 29 denotes a phosphor which should radiate in green but appears as a black shadow because the foreign matter 5 is adhering to the corresponding hole of the shadow mask 3.

Operation of aligning the electron beam 12 with the detected foreign matter 5

First, in FIG. 1, after the cathode switching circuit 19 has selected the cathode 6 associated with green G, the switching circuit 23 selects the dc deflection control circuit 22 and the switching circuit 26 selects the pulse oscillator 25.

Figure 3A:
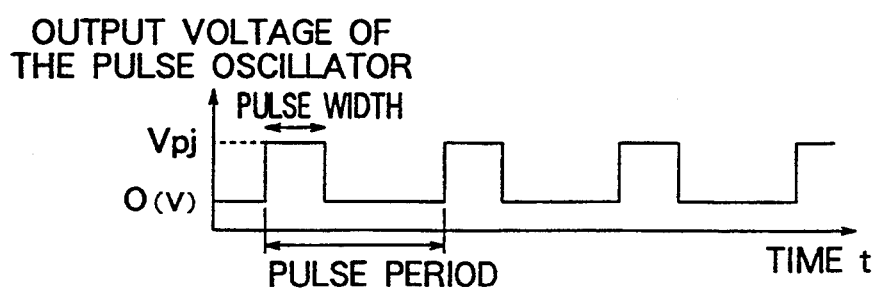
FIGS. 3a to 3c show waves of signals generated by a beam generator in Embodiment 1 of the present invention.
Figure 3B:
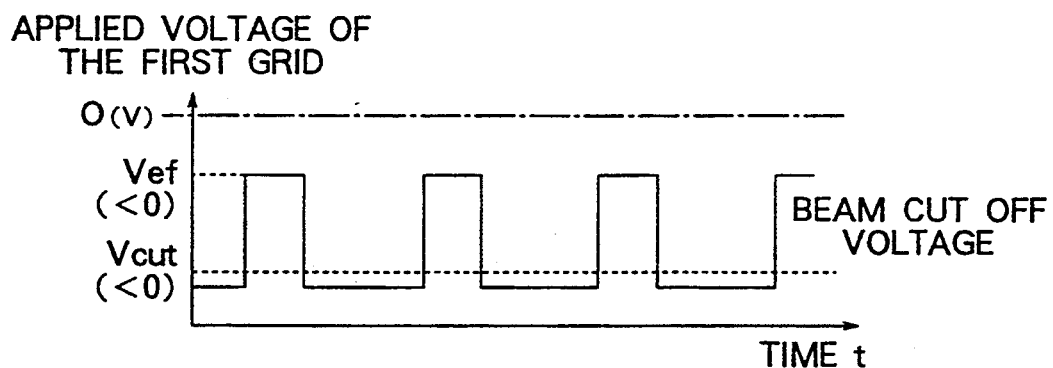
Figure 3C:
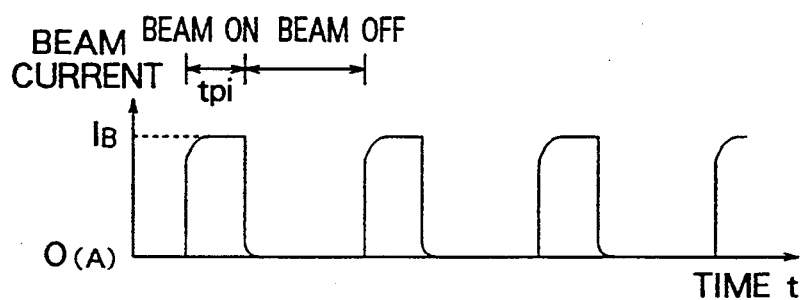

FIG. 3a shows the wave of an output voltage of the pulse oscillator 25. FIG. 3b shows the wave of an output voltage of the first grid control amplifier 27; that is, the wave of a voltage applied to the first grip electrode 8. FIG. 3c shows the wave of a beam current output. The pulse oscillator 25 generates, as shown in FIG. 3a, pulses each having an amplitude $V_{PJ}$. The pulses are reversed in polarity and amplified by the first grid control amplifier 27. Pulses each having an amplitude $V_{ef}$ ($<0$), as shown in FIG. 3b, are then applied to the first grid electrode 8. Consequently, an electron beam 12 of green G carrying a beam current $I_B$ shown in FIG. 3c is emitted in the form of pulses.

The dc deflection control circuit 22 moves a beam spot to the vicinity of the detected foreign matter 5 while controlling horizontal and vertical deflection of a beam spot. Next, the voltage of the focusing power supply 16 is regulated to converge the electron beam 12 so that the radiant circle on the fluorescent screen 2 will have a specified diameter.

Figure 4:
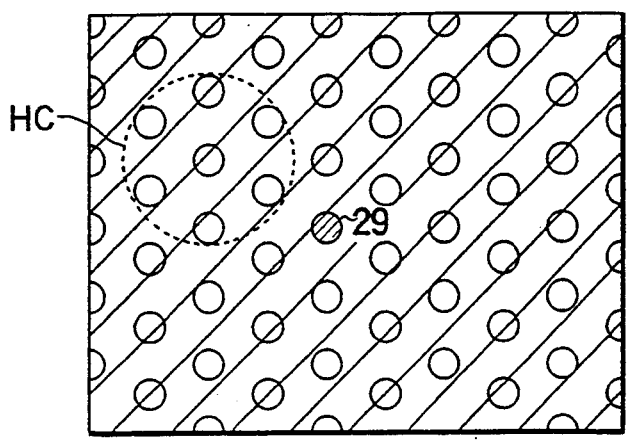
FIG. 4 is an enlarged view of a fluorescent screen showing a radiant area during alignment according to Embodiment 1 of the present invention.

FIG. 4 shows the radiant state of phosphors on the tube surface. Only the circular area surrounded with a dashed line HC and containing white dots appears in green. The diameter of the circle indicated with the dashed line HC (hereafter, radiant circle) is regarded as a radiant diameter on the fluorescent screen 2.

Normally, even when a convergent voltage applied to a certain type of cathode-ray tube is the same, the beam diameter varies slightly between the center and ends of a screen, or with a difference in beam convergent characteristic due to an individual difference of an electron gun. A difference in tube size between different types of tubes, for example, between a television picture tube and a display monitor tube causes the above variation of a beam diameter.

In any type of tube, if a convergent voltage is finely regulated so that the diameter of a radiant circle HC of a convergent beam on a tube surface will be held constant all the time, since the size of the radiant circle HC is in correspondence with a beam diameter, an electron beam having substantially the same beam current density can be radiated irrelevant of a type of tube concerned. This realizes the standardization of the parameters for irradiation permitting removal of a foreign matter without thermal deformation of a shadow mask or damage to phosphors.

Figure 5:
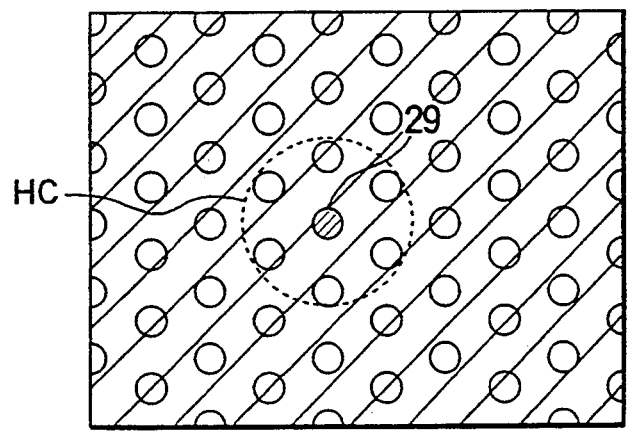
FIG. 5 is an enlarged view of a fluorescent screen with the center of an irradiated area aligned with the center of a black shadow according to Embodiment 1 of the present invention.

As described above, after the radiant diameter is set to a specified value, while horizontal deflection and vertical deflection are being finely controlled, the center of the radiant circle HC is aligned with the center of the shadow 29 derived from the foreign matter 5. FIG. 5 shows this state. When the electron beam 12 is aligned with the foreign matter 5, the electron beam 12 is turned on and off and thus pulsed. The parameters for pulse output are as follows: the beam current value (equivalent to a pulse voltage level) is unchanged from that for foreign matter removal, which will be described later, but the pulse width is set to a value considerably smaller than (about one-tenths of) the pulse width for foreign matter removal.

FIG. 6 shows the waves of pulses making up the electron beam 12 during alignment of the radiant circle HC and during foreign matter removal. FIG. 6a shows the wave of pulses during alignment, while FIG. 6b shows the wave of pulses during foreign matter removal.

A very important point for efficient removal of a foreign matter adhering to a shadow mask is that an electron beam is aligned precisely with and irradiated exactly to a foreign matter discovered on a tube surface.

Detection of the position of a foreign matter on a tube surface or alignment of an electron beam with a foreign matter is usually accomplished under visual observation. In an effort to improve the precision of the work, an ITV camera 28 is employed as a supplementary means to produce an enlarged observation image.

The simplest method for matching a point of alignment of an electron beam with a foreign matter and a point of irradiating an electron beam for foreign matter removal is that the same quantity of beam current and the same pulse duty factor should be adopted for alignment and for foreign matter removal. When this method is employed, however, the radiant intensity of phosphors on a tube surface becomes very high during alignment. If the phosphors are imaged with the F-number of a camera lens of the ITV camera 28 unchanged from that for the detection of the position of a foreign matter, blooming occurs. Consequently, it becomes very hard to observe the radiant diameter and the position of the target foreign matter 5. Beam alignment becomes almost impossible. This is also true for the visual observation without the ITV camera 28.

According to the two techniques below, even when the diameter of the radiant circle HC consisting of phosphors on a tube surface is measured in the course of alignment with a Foreign matter, the ITV camera 28 will not cause blooming.

(1) In the stage of alignment with a foreign matter, the diaphragm of a camera lens in the ITV camera 28 is changed to obtain a larger F-number (smaller aperture size) than that for the detection of the position of a foreign matter. Alternatively, a filter (for example, ND filter) is mounted on the camera lens.

(2) While the F-number of a camera lens is unchanged from that for the detection of the position of a foreign matter, the quantity of charge, which is carried by an irradiation beam and supplied to phosphors, per unit time is restricted so as to suppress the radiant intensity of phosphors.

The technique (1) requires complex work including changing of the F-number of a camera lens and mounting of a filter at the time of transition from detection of the position of a foreign matter to alignment.

A specific means for realizing the technique (2) is then pondered over. The following two solutions are conceivable:

(1) The pulse duty factor for alignment is unchanged from that for foreign matter removal, but the quantity of beam current for alignment is made smaller than that for foreign matter removal.

(2) On the contrary, the quantity of beam current is unchanged but the pulse width is made smaller. Alternatively, the pulse duty factory is varied.

The solution (1) causes the following drawback: in practice, it is hard to assemble a cathode-ray tube with the electrodes in an electron gun aligned precisely with phosphors. An arrangement capable of keeping an electromagnetic distribution in a perfectly axially symmetric form is hardly available. When the quantity of beam current is varied, therefore, the focal point of an electron beam moves.

As shown in FIG. 6, when the solution (2) adopted in the method of the present invention that; the quantity of beam current is unchanged but the pulse width or period is varied, is implemented, the trajectory or convergent state of an electron beam is maintained. The position and diameter of a beam radiated to a foreign matter on a shadow mask is held unchanged between alignment and foreign matter removal, because the focal point does not move.

Operation of removing a foreign matter 5

As described above, after an electron beam is aligned with a foreign matter 5, the foreign matter 5 is removed with the electron beam unmoved. The parameters for pulse output by the pulse oscillator 25 are as follows: the quantity of beam current is the same as the quantity of beam current IB for alignment, which is shown in FIG. 6a, the pulse width $t_{p2}$ is made longer (about ten times as longer as), as shown in FIG. 6b, than the pulse width $t_{p1}$ for alignment. Under these parameters, an output of pulse voltage is generated with a specified pulse period for a specified period of time (from the start to end of generation of a pulse train). The beam current value, and the ratio of a pulse width to a pulse period; that is, the pulse duty factor are pre-set to such conditional ranges that do not cause thermal deformation of the shadow mask 3 and thermal denaturation of the fluorescent screen 2. The conditional ranges are determined experimentally.

A basic idea for removing a foreign matter by radiating an electron beam is that the kinetic energy of an electron beam is converted into heat, and the heat is used to dissolve and burn a foreign matter. Key physical quantities include an accelerating voltage Vk, a beam current density Id, and a total power on time Tp. When an electron beam is irradiated to a foreign matter, assuming that all the energy the electrons carry is converted into heat, heat energy per unit area, Je, is represented as the following expression:

$$Je = Vk \cdot Id \cdot Tp$$

Normally, when an electron beam a cathode-ray tube generates is used, since Vk is fixed to +27 kV, an element capable of varying Je is the beam current density Id or total power on time Tp. A basic idea for applying high heat energy selectively to foreign matters will be described in conjunction with FIG. 8.

(1) Irradiation with a high peak current density.

Figure 8A:
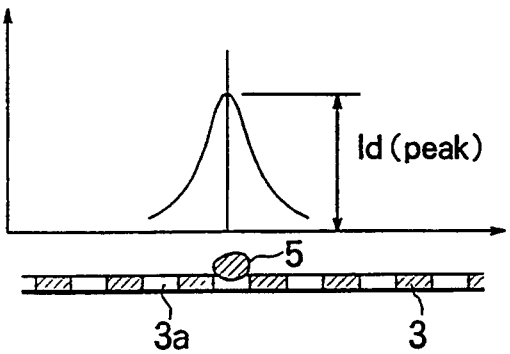
FIGS. 8a to 8c are explanatory diagrams concerning the basic concepts of foreign matter removal according to the present invention.

To provide high energy Je, first of all, the beam current density Id must be high. FIG. 8a is an explanatory diagram showing the relationship between the foreign matter 5 and heat energy distribution. The graph in FIG. 8a has beam current densities Id ($A/m^2$) on the axis of ordinates and positions along the diameter of a radiant circle HC on the axis of abscissas. If the distribution of current densities in an electron beam on a focal surface is, as shown in FIG. 8a, conformable to a Gaussian distribution, it is effective that the peak current be made higher.

(2) Convergence of an electron beam

Figure 8B:
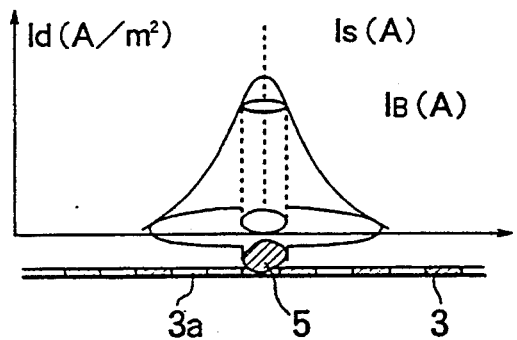

To apply heat energy effectively to the foreign matter 5, the ratio of the quantity of beam current applied to the foreign matter 5 $I_S$ to the total quantity of beam current $I_B$. $I_S/I_B$, must be high. FIG. 8b is an explanatory diagram showing the relationship between the heat energy irradiated to the foreign matter 5 and the heat energy deviating from the foreign matter 5. The graph in FIG. 8b is identical to that in FIG. 8a in terms of both the axes of ordinates and abscissas. As apparent from FIG. 8b, it is preferable that an electron beam be converged.

(3) Intermittent irradiation of a beam

When an electron beam is converged and the beam current Id is made higher, if the total power on time Tp is prolonged, the heat energy Je can be increased. If high heat energy is applied temporally continuously, heat is accumulated in a mask or phosphors. This may trigger thermal deformation of the mask or thermal damage to the phosphors. The total power on time Tp is shared between heat energy application periods and pause periods which come alternately, whereby heat energy is applied intermittently. The insertion of periods of dissipating accumulated heat suppress thermal deformation of the mask and thermal damage to the phosphors.

Figure 8C:
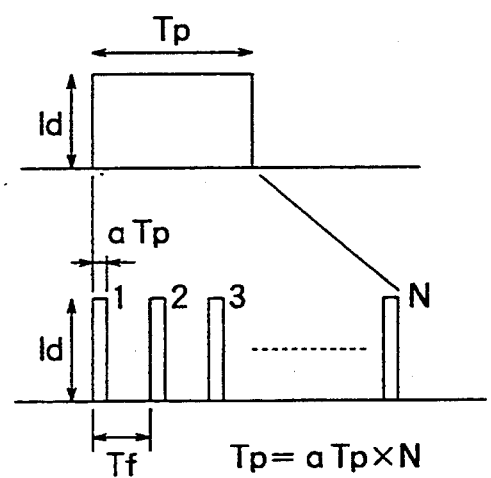

FIG. 8c is an explanatory diagram showing the relationship between intermittent irradiation of an electron beam according to the present invention and continuous irradiation of a prior art. The upper part of FIG. 8c shows a conventional method or continuous generation of an electron beam, wherein the beam current density is Id (A/m$^2$) and the total power on time is Tp. In the method of the present invention, the total power on time Tp is divided into N portions. That is to say, the beam current density for each pulse is Id (A/m$^2$), and the power on time for each pulse is $\alpha$Tp. Since the frequency is N, the total power on time Tp identical to that for continuous irradiation is provided as Tp=$\alpha$Tp×N.

Figure 9:
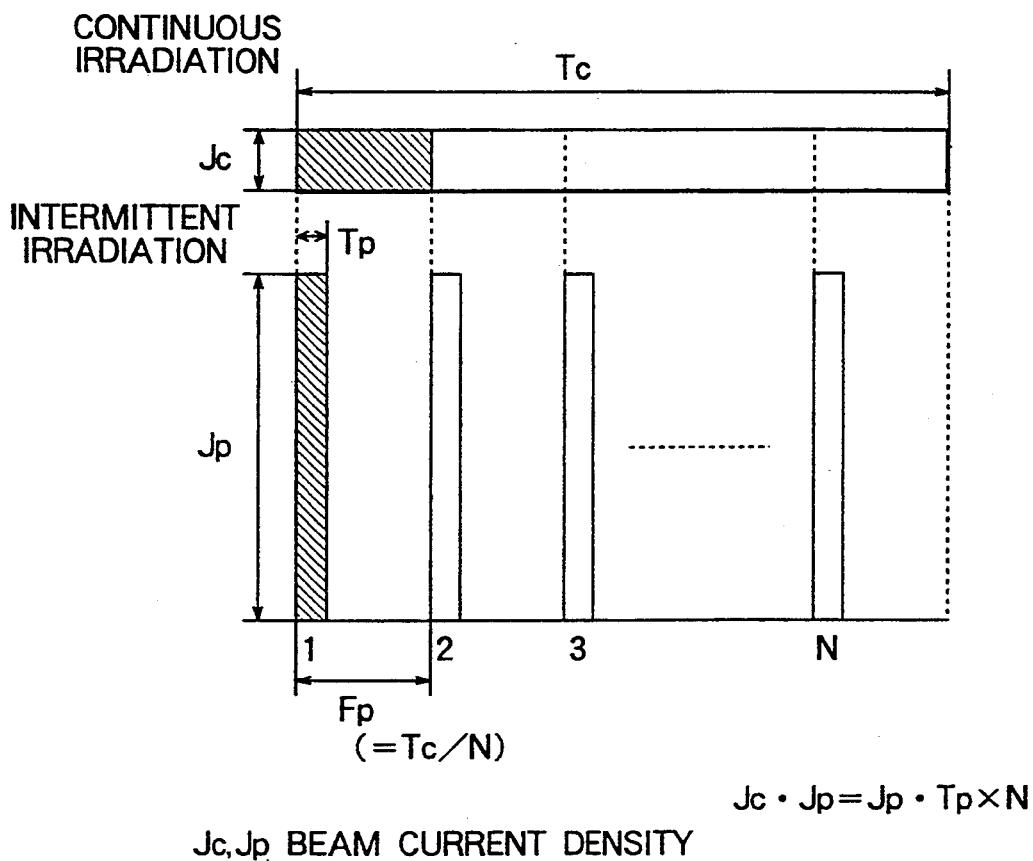
FIG. 9 is a chart comparing the parameters for irradiation using a conventional continuous electron beam irradiation method with those using an intermittent irradiation method of the present invention.

FIG. 9 is a chart for comparing the parameters for irradiation between the continuous irradiation method of a prior art and the intermittent irradiation method of the present invention.

(1) Continuous irradiation

An irradiation energy density Ec (joule/m$^2$) causing no damage to a mask or phosphors is provided as the following expression (1):

$$Ec = Vk \cdot Jc \cdot Tc \quad (1)$$

where, Vk is an accelerating voltage (volt), jc is an irradiation current density (A/m$^2$), and Tc is a continuous irradiation time.

(2) Intermittent irradiation

Assuming that the continuous irradiation time Tc is divided into N pulsed irradiation periods, an irradiation energy density Ep per pulse (joule/m$^2$) is provided as the following expression (2):

$$Ep = Vk \cdot Jp \cdot Tp \quad (2)$$

where, Jp is an irradiation current density per pulse (A/m$^2$), and Tp is a pulse duration (sec).

The following expression (3) is established:

$$Ep = Tc/N \quad (3)$$

from expressions (1) to (3), the following expression (4) is provided:

$$Jc/Jp = Tp/(Tc/N) = Tp/Fp \quad (4)$$

where, Jp is larger than Jc, and Fp is a pulse period. Conclusively, a quantity of beam current, a pulse width, and a pulse period should be determined so that the pulse duty factor Dp (=Tp/Fp) will equal to Jc/Jp.

Based on an idea that the quantities of applied energy per unit area and unit time should be the same between continuous irradiation and intermittent irradiation, various combinations of a quantity of beam current and a pulse duty factor that are parameters for intermittent irradiation are conceivable. Since restrictions are placed so as not to cause thermal deformation of a mask or thermal damage to phosphors, the number of combinations is, however, limited.

An experiment conducted using an actual cathode-ray tube revealed that phosphors may be damaged under the parameters for intermittent irradiation causing no thermal deformation of a mask. This implies that since intermittent irradiation requires a higher beam current density, consideration must be taken into damage to phosphors rather than the mask.

In order to avoid the damage to phosphors, a one-shot irradiation time Tp or a period of time in which a shot of a beam (one-shot irradiation) causes no damage to phosphors is measured experimentally in terms of such a parameter as a quantity of beam current. When combinations of a quantity of beam current and a pulse duty factor for intermittent irradiation are determined, a shot time per pulse (equivalent to a pulse width) should be lower than at least the measured Tp value.

Processing after removal of a foreign matter

When removal of the foreign matter 5 is completed, a whole raster scan screen is recalled and observed to see if the foreign matter 5 has been removed completely. At the same time, it is also checked if the brightness of phosphors in the vicinity of an area in which the foreign matter 5 was present has deteriorated due to influence of irradiation of the electron beam 12. This check has been achieved by performing a sensitivity test in the past. The determination has sometimes differed from operator to operator.

A video signal sent from the ITV camera 28 is used to achieve quantitative determination. Specifically, as shown in FIG. 7a, the ITV camera 28 is used to produce an enlarge image of the fluorescent screen 2 after a foreign matter is removed. A video signal representing a horizontal scanning line 31 of the ITV camera 28 that travels through a phosphors 30-2, which has been visualized as a black shadow 29 before the foreign matter is removed, is fetched out. The voltage level of the fetched signal is compared with those of the surrounding phosphors 30-1, 30-3, and 30-4. Thus, a change in brightness of the phosphor 30-2 is calculated quantitatively.

In FIGS. 7b and 7c, the axis of ordinates indicates video signal levels, and the axis of abscissas indicates phosphors. If no thermal damage occurs, the phosphors 30-1 to 30-4 have the same video signal level as shown in FIG. 7b. If thermal damage occurs, the video signal level of the phosphor 30-2 becomes lower than those of the other phosphors.

Next, the advantages of the aforesaid Embodiment 1 will be presented.

Efficiency in removing a foreign matter using intermittent beam irradiation

Described hereafter is that intermittent irradiation of the electron beam 12 is more efficient in terms of heating removal of a foreign matter than conventional continuous irradiation. FIG. 10 is a graph showing the results of computer-aided simulation of temporal transition of a temperature rise derived from mask heating in the vicinity of an irradiation point provided when an electron beam spot is irradiated to a foreign matter blocking a hole of a shadow mask. The simulation was performed under the following conditions:

(1) The mask has a thickness of a numerical value written on a cathode-ray tube actually employed, and is shaped like a square of 500×500 mm. The outer circumferential surface is stationary in an environment at a room temperature.

(2) The mask is made of Invar (iron+nickel (36%)). The specific heat, specific gravity, heat conductivity, radiation ratio (on the assumption of a blackened film) are as per those inherent to the material.

(3) The mask has only one hole. The diameter of the hole is about one hundred and several microns actually but set to 1 mm because of the restrictions on calculation.

(4) A foreign matter is made of the same material as the mask; that is, Invar. The thickness thereof is the same as the actual one of the mask. The disk-like foreign matter of 1 mm in diameter is blocking the hole of the mask.

(5) Only heat conduction is taken account of as heat transportation between the foreign matter and mask. In practice, it is unthinkable that the side surface of the hole and the disk-like foreign matter are in close contact with each other. A parameter or what is referred to as "thermal contact rate $\eta$ ($0 \leq \eta \leq 1$) is introduced by which a close contact area is multiplied to provide an actual thermal contact area.

(6) The accelerating voltage of an electron beam to be irradiated is +27 kV which is specific to a normal cathode-ray tube, the spatial distribution of beam intensities is conformable to a Gaussian distribution that is axially symmetrical, the diameter thereof is 2 mm with full width at half maximum (FWHM). (The electron beam of an actual cathode-ray tube permits convergence into 500 to 600 $\mu$m on a tube surface.)

Figure 10B:
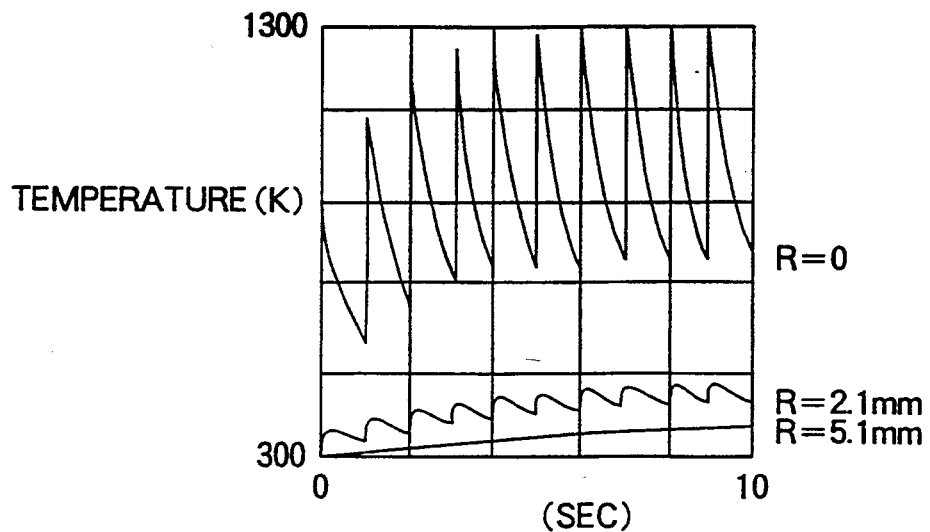
FIGS. 10a and 10b show results of computer-aided simulation of the transition of a temperature rise due to mask heating resulting from the irradiation of an electron beam according to the method of the present invention and from the irradiation according to a conventional method.
Figure 10A:
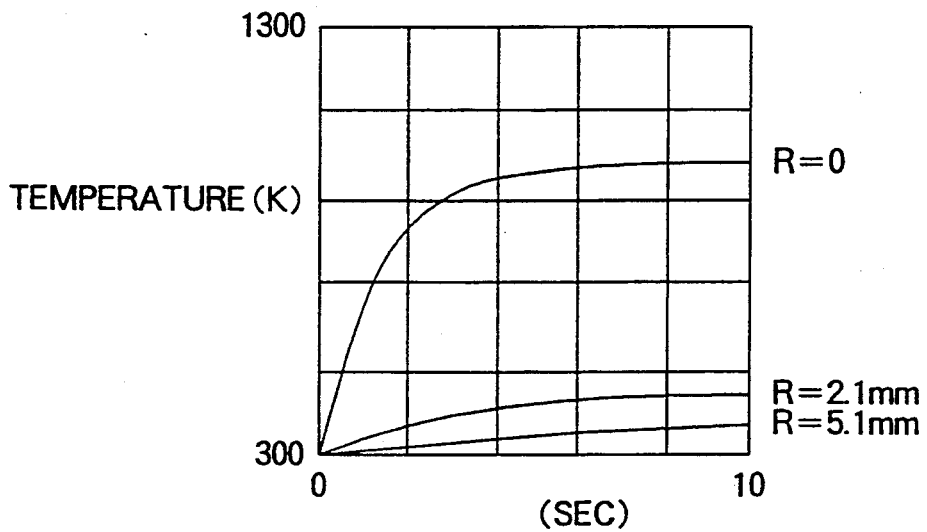

FIG. 10a is a graph of the temporal transition of a temperature rise at the center of an irradiation spot (R=0), a position apart from the center by 2.1 mm (R=2.1 mm), and a position apart from the center by 5.1 mm (R=5.1 mm) occurring when continuous irradiation is performed at intervals of 10 sec with a beam current of 50 microampere. FIG. 10b is a graph showing the temporal transition of a temperature rise at each of the positions indicated as R =0, 2.1 and 5.1 occurring when intermittent irradiation is performed with a beam on time (irradiation time) of 10 ms and an off time of 990 ms; that is, at intervals of 10 sec with a frequency of 1 Hz.

In either of FIGS. 10a and 10b, heat energy is 13.5 joule.

Continuous irradiation: Je [27 kV]×[0.05 mA]×[10 sec]=13.5 joule.

Intermittent irradiation: Je [27 kV]×{5 mA]×[0.01 sec]×[10 shots]=13.5 joule.

It is assumed that a foreign matter is adhering to the hole of a mask to such an extent that the foreign matter slightly abuts on the margin of the hole (the thermal contact rate $\eta$ in the condition (5)=0).

The above results have revealed the following:

(1) The most obvious feature of the transition of a temperature rise in intermittent irradiation is a saw-toothed change in which a temperature rise and drop are repeated periodically.

(2) The above feature is apparent in the vicinity of an beam irradiation point. The temperature rise becomes similar to that for continuous irradiation, in which an average quantity of input heat is constant, as parting from the irradiation point.

(3) Even in the vicinity of the beam irradiation point, plotting the temporal transition showing the saw-toothed temperature change provides the temperature rise identical to that for continuous irradiation in which the average quantity of input heat is constant.

Conclusively, irradiating a beam intermittently can be regarded as synonymous with "realizing instantaneous high-temperature heating of a beam irradiation area while holding a time-average temperature the same as a temperature for continuous irradiation."

Effective in avoiding the thermal deformation of a mask resulting from intermittent beam irradiation As described previously, when the diameter of a beam is set to about 700 $\mu$m on a tube surface of an actual cathode-ray tube and then intermittent irradiation was performed at intervals of 10 sec with a quantity of beam current 40 $\mu$A or less, a mask was not deformed with heat. This result of an experiment and the above conclusion prove that: when the quantity of beam current and the duty ratio for intermittent irradiation (ratio of an electron beam on time to an on or off period of an electron beam) are determined properly so that the quantity of applied energy carried by a beam per unit area or unit time will be the same between continuous irradiation and intermittent irradiation, a beam with a high current density can be irradiated without any thermal effects to a mask, and eventually a foreign matter can be removed instantaneously by heating it at a high temperature.

Embodiment 2

Embodiment 2 employs a driving system enabling the on or off operation of an electron beam for the cathodes 6 for realizing intermittent irradiation of an electron beam.

Figure 11:
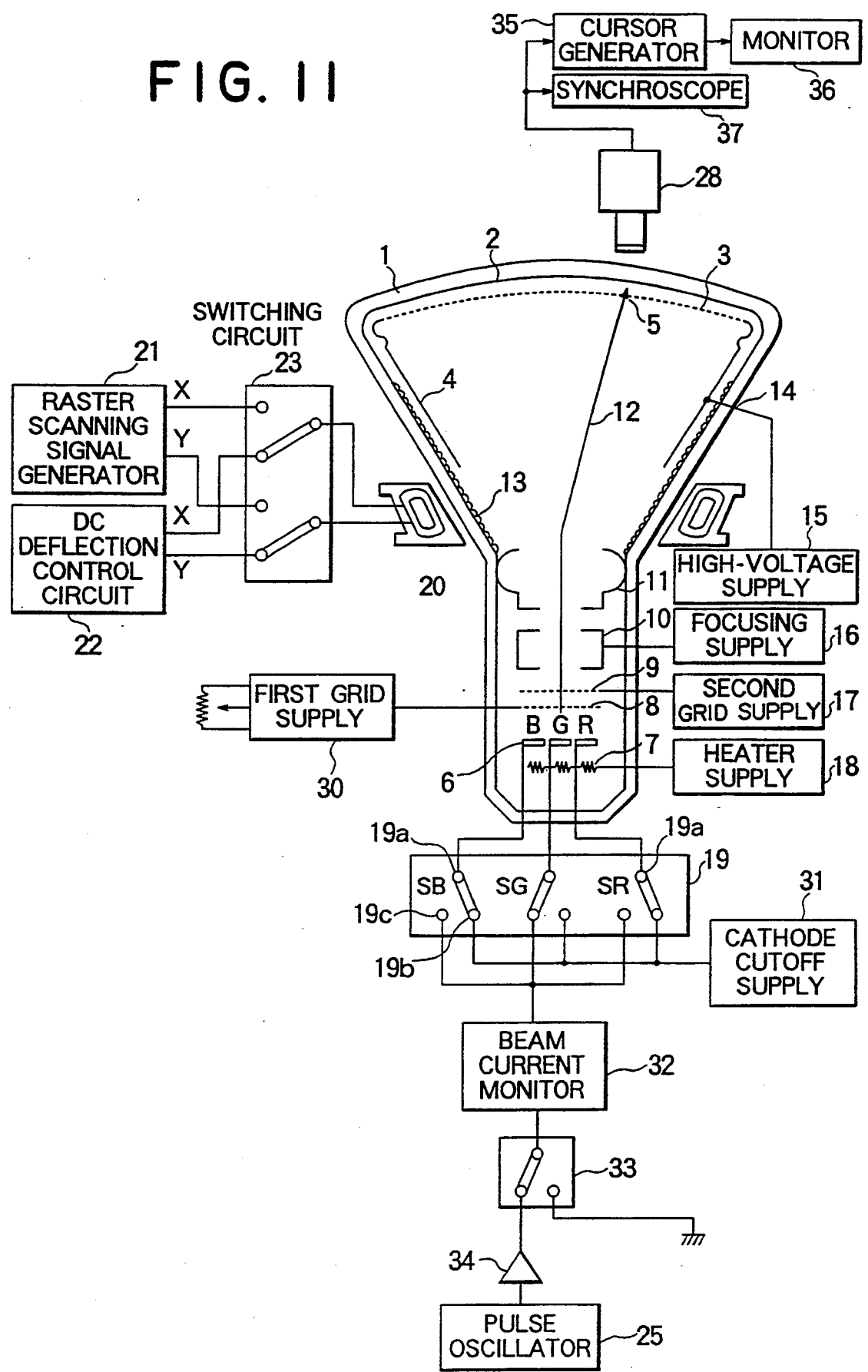
FIG. 11 is a constructional diagram of an apparatus represent Embodiment 2 of the present invention.

FIG. 11 is a constructional diagram of an apparatus representing Embodiment 2. In this Embodiment 2, the circuitry of the dc voltage generator 24, pulse oscillator 25, switching circuit 26, and first grid control amplifier 27 in Embodiment 1 is modified as follows: the first grid power supply 30 is connected to the first grid electrode 8 and the cathode switching circuit 19 is made switchable selectively to a cathode cutoff supply 31 or the pulse oscillator 25.

To be more specific, the cathode switching circuit 19 includes three sets of select switches SB, SG, and SR. Each of the select switches SB, SG, and SR have a contact 19a connected to an associated one of B, G, and R cathodes 6, a contact 19b connected to the cathode cutoff supply 31, and a contact 19c connected to a beam current monitor 32. The contact 19a is connectable selectively to the contact 19b or 19c.

The beam current monitor 32 is connected to the pulse oscillator 25 via a cathode amplifier 34 and a select switch 33.

The ITV camera 28 is connected to a monitor 36 via a cursor generator 35 and to a synchroscope 37.

Next, the operation of Embodiment 2 will be described.

First, the switches SB and SR in the cathode switching circuit 19 are switched to connect the B and R cathodes 6 to the cathode cutoff supply 31. The switch SG is switched to ground the G cathode 6 via the select switch 33.

The voltage of the first grid supply 30 is regulated so that a correct negative voltage will be applied to the first grid electrode 8. Since a positive voltage (for example, +100 V) has been applied from the cathode cutoff supply 31 to the B and R cathodes 6, the electron beams sent from the B and R cathodes 6 are cut off, and only the electron beam sent from the G cathode 6 is irradiated. At this time, the switching circuit 23 selects the raster scanning signal generator 21 so as to actuate the deflection coil 20. Thus, a monochrome (green) beam current scans all over a screen to produce a raster.

If the foreign matter 5 is adhering to the shadow mask 3, the corresponding area in a screen is visualized as a black dot. After the field of view of the ITV camera 28 is aligned with the position of the black dot and the F-number of the camera lens is determined so as to focus the position of the black dot, an enlarged image is produced. The enlarged image is visualized identically to that of Embodiment 1 shown in FIG. 2.

Next, the voltage of the first grid supply 30 is regulated again to apply a negative voltage to the first grid electrode 8. With an aid of the beam current monitor 32, the voltage of the first grid supply 30 is set so that a specified beam current will flow. The switching circuit 23 is operated to select the dc deflection control circuit 22, and the select switch is switched to connect the G cathode 6 to the pulse oscillator 25 via the cathode amplifier 34. The pulse oscillator 25 is then actuated to generate a positive rectangular-wave voltage. The G cathode 6 then emits an electron beam 12 in the form of pulses.

Figure 12A:
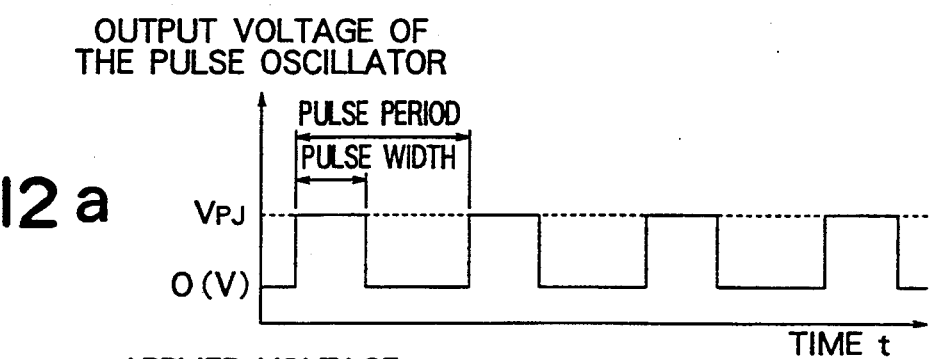
FIGS. 12a to 12c show waves of signals generated by a beam generator in the apparatus of Embodiment 2 of the present invention.
Figure 12B:
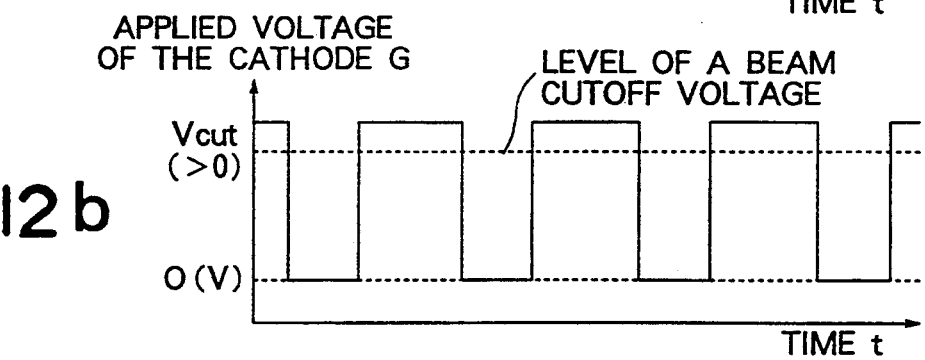
Figure 12C:
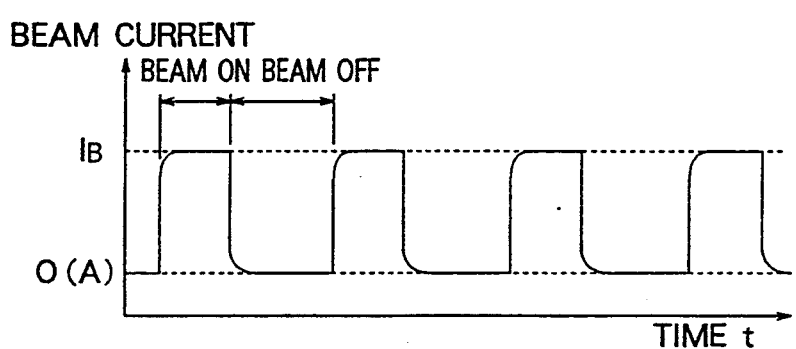

FIG. 12 shows the waves of signals generated and emitted as mentioned above. FIG. 12a shows the wave of an output voltage of the pulse oscillator 25. FIG. 12b shows the wave of an output voltage of the cathode amplifier 34; that is, the wave of a voltage applied to the G cathode 6. FIG. 12c shows the wave of a beam current output.

The dc deflection control circuit 22 moves the beam spot to the vicinity of the detected foreign matter 5 while controlling the horizontal and vertical deflection of a beam spot. The voltage of the focusing supply 16 is regulated so that a radiant circle on the fluorescent screen 2 will have a specified diameter. With reference to a cursor window KW of FIGS. 13 and 14 displayed on a monitor 36, the diameter of the radiant circle HC is set. The diameter of the radiant circle HC is measured using an enlarged image of the corresponding area the ITV camera 28 has produced with the F-number of the camera lens identical to that for foreign matter detection.

Figure 13:
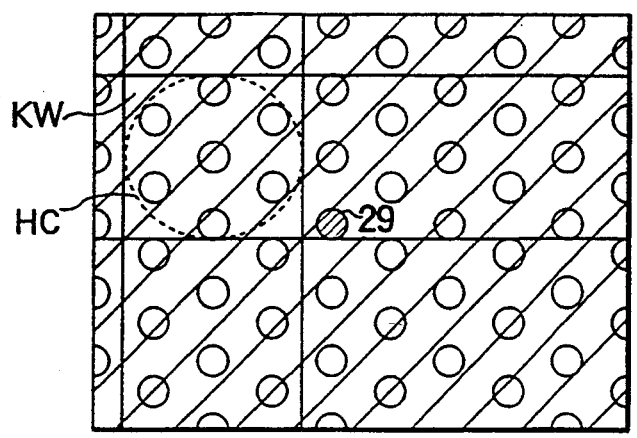
FIG. 13 is an enlarged view of a fluorescent screen showing a radiant area during alignment according to Embodiment 2 of the present invention.
Figure 14:
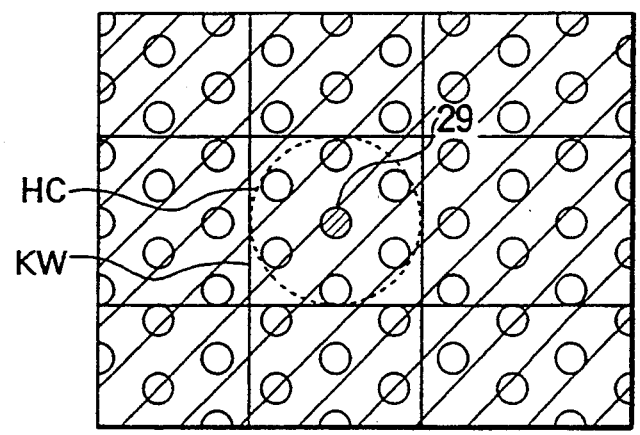
FIG. 14 is an enlarged view of a fluorescent screen with the center of a radiant area aligned with the center of a black shadow according to Embodiment 2 of the present invention.

FIGS. 13 and 14 correspond to FIGS. 4 and 5 for Embodiment 1. The center of the cursor window KW is moved to align with the center of the black shadow 29. With reference to the cursor window KW, the horizontal and vertical deflection of a beam spot are finely controlled so that the center of the radiant circle HC will align with the center of the black shadow 29 as shown in FIG. 14. The other operations are substantially identical to those in Embodiment 1.

Embodiment 3

In the aforesaid embodiments, a drive for driving a cathode voltage is provided as a means for turning on or off an electron beam for intermittent irradiation. The same operation can be achieved by driving other electrode voltage (first grid voltage, second grid voltage, or accelerating voltage) in an electron gun. Embodiment 3 adopts a method of driving a first grid voltage.

Figure 15:
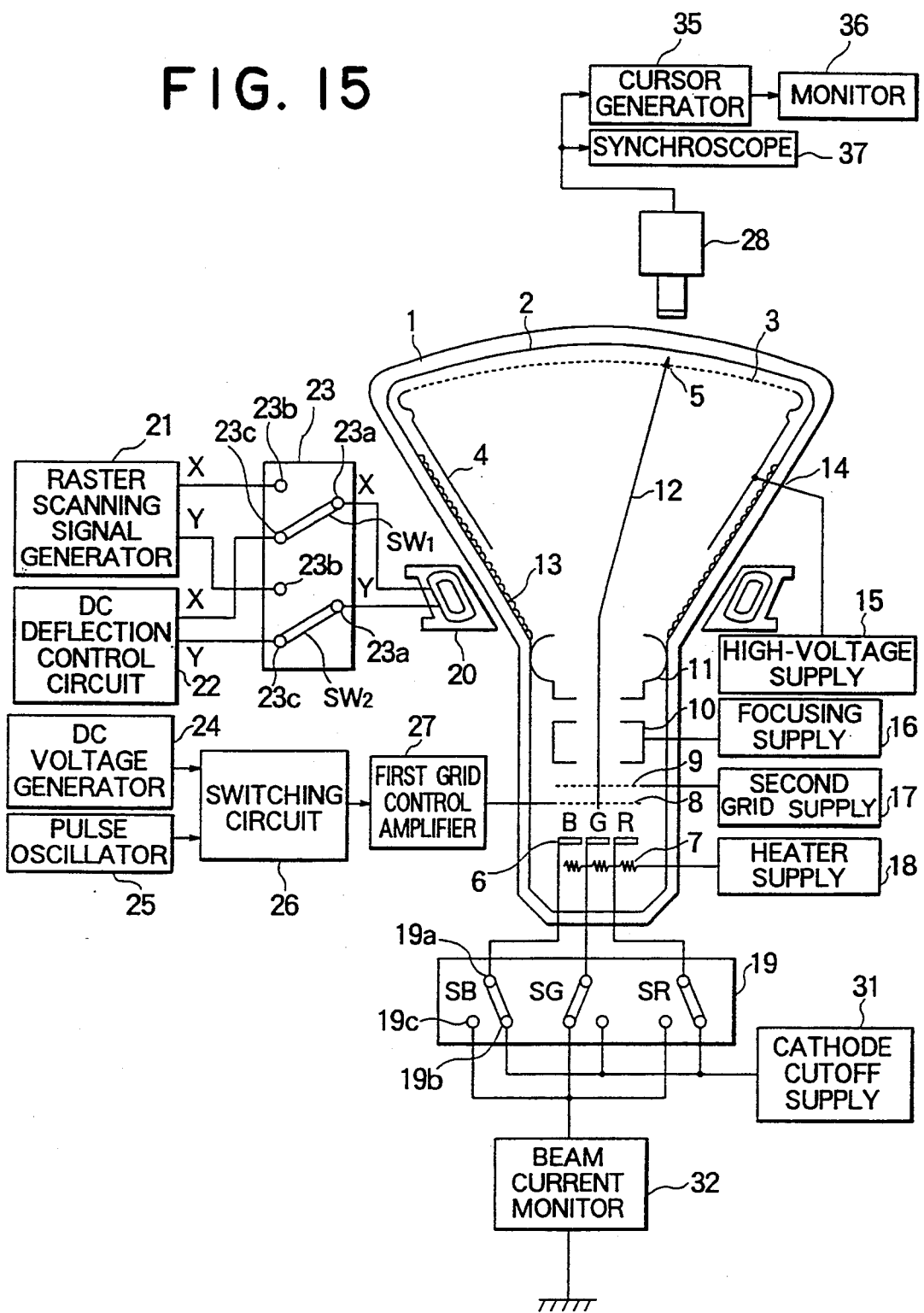
FIG. 15 a constructional diagram of an apparatus representing Embodiment 3 of the present invention.
Figure 16:
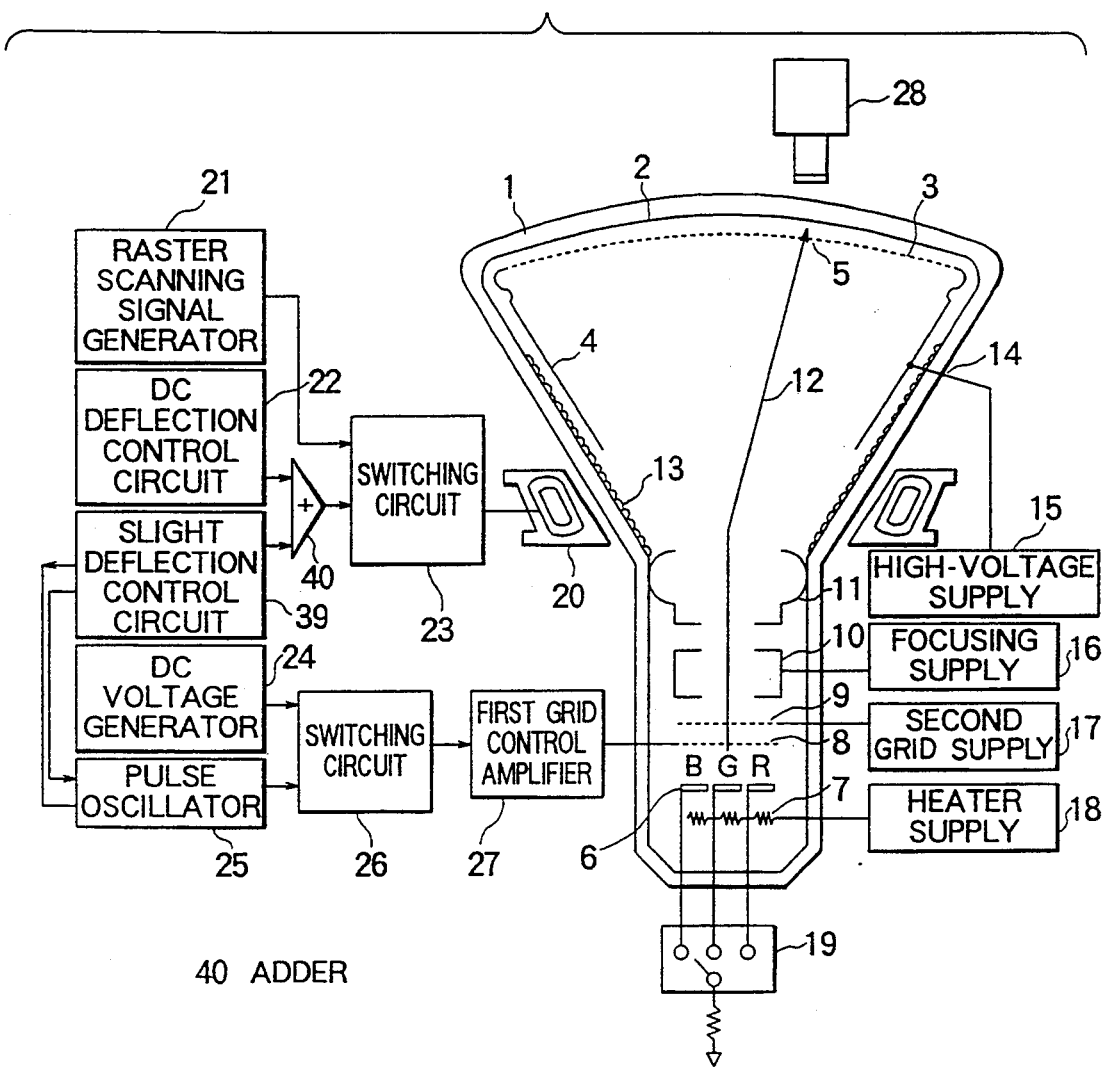
FIG. 16 is a constructional diagram of an apparatus representing Embodiment 4 of the present invention.

FIG. 15 is a constructional diagram of an apparatus showing a construction of the third embodiment. In this Embodiment 3, two switches $SW_1$ and $SW_2$ are inserted in the switching circuit 23. The contacts 23a of the switches are connected to the deflection coil 20, the contacts 23b thereof are connected to the raster scanning signal generator 21, and the contacts 23c thereof are connected to the dc deflection control circuit 22. The contacts 19a of three sets of switches SB, SG, and SR in the cathode switching circuit 19 are connected to the B, G, and R cathodes 6. The contacts 19c thereof are connected to the beam current monitor 32. The contacts 19b thereof are connected to the cathode cutoff supply 31. The ITV camera 28 is connected to the monitor 36 via the cursor generator 35 and to the synchroscope 37.

In Embodiment 3 having the above construction, the G cathode 6 is selected under the control of the cathode switching circuit 19. The switching circuit 23 is operated to select the raster scanning signal generator 21. A specified negative voltage is then applied to the first grid electrode 8 via the first grid control amplifier 27, whereby a specified beam current flows to produce a monochrome (green) raster.

When the electron beam 12 is to be aligned with a detected foreign matter, the switching circuit 26 is operated to select the pulse oscillator 25. An output voltage of the pulse oscillator 25 is reversed in polarity and amplified by the first grid control amplifier 27, and then applied to the first grid electrode 8. Thereby, the electron beam 12 is turned on or off to achieve intermittent irradiation.

The procedures for deflecting a beam spot and aligning it with a foreign matter, for removing the foreign matter by performing intermittent irradiation, and for observing the fluorescent screen after the foreign matter is removed are substantially identical to those in Embodiment 1.

As long as an applied voltage is varied according to a procedure similar to the above one, even when the second grid voltage or accelerating voltage is driven, a beam can be irradiated intermittently.

Embodiment 4

If the foreign matter 5 adhering to the shadow mask 3 is relatively large, as shown in FIGS. 5 and 14, the foreign matter 5 can sometimes not be removed merely by aligning the center of the radiant circle HC on the fluorescent screen 2 with the center of the black shadow 29 and then irradiating a beam to the black shadow. Embodiment 4 resolves this problem, wherein a function for slightly deflecting a beam irradiation point of the foreign matter 5 is added to the functions of Embodiment 1.

FIG. 1B is a constructional diagram of an apparatus showing a construction of Embodiment 4. Embodiment 4 includes a slight deflection circuit 39 and an analog adder 40. The dc deflection control circuit 22 and slight deflection circuit 39 are connected to the switching circuit 23 via the analog adder 40. The slight deflection circuit 39 and pulse oscillator 25 are connected with each other.

In Embodiment 4 having the above construction, the dc deflection control circuit 22 is selected, and the irradiation point of an electron beam is aligned with the center of the black shadow 29. Thereafter, the pulse oscillator 25 is actuated so as to irradiate the electron beam 12 to the foreign matter 5 in the form of pulses for a specified period of time. When the specified period of time elapses, the pulse oscillator 25 feeds a trigger signal to the slight deflection control circuit 34. The slight deflection control circuit 34 generates a constant slight dc voltage.

The slight dc voltage is added to a dc voltage of the dc deflection circuit 22 by the analog adder 40, and then applied to the deflection coil 20. The electron beam 12 is deflected to a position slightly away from the initial irradiation point. In parallel with the trigger signal fed by the pulse oscillator 25, a reverse trigger signal is transmitted from the slight deflection control circuit 34 to the pulse oscillator 25. A pulsed beam is then irradiated for the specified period of time.

Thus, the beam irradiation point inches in the vicinity of the foreign matter 5 sequentially. For setting positions to which a beam is deflected sequentially, a memory is incorporated in the slight deflection control circuit 39 and the data of slight deflection voltages associated with the positions are stored in the memory beforehand.

The other components and the operation are identical to those of Embodiment 1. Identical components bear the same numerals. The description will be omitted.

Embodiment 5

Figure 17:
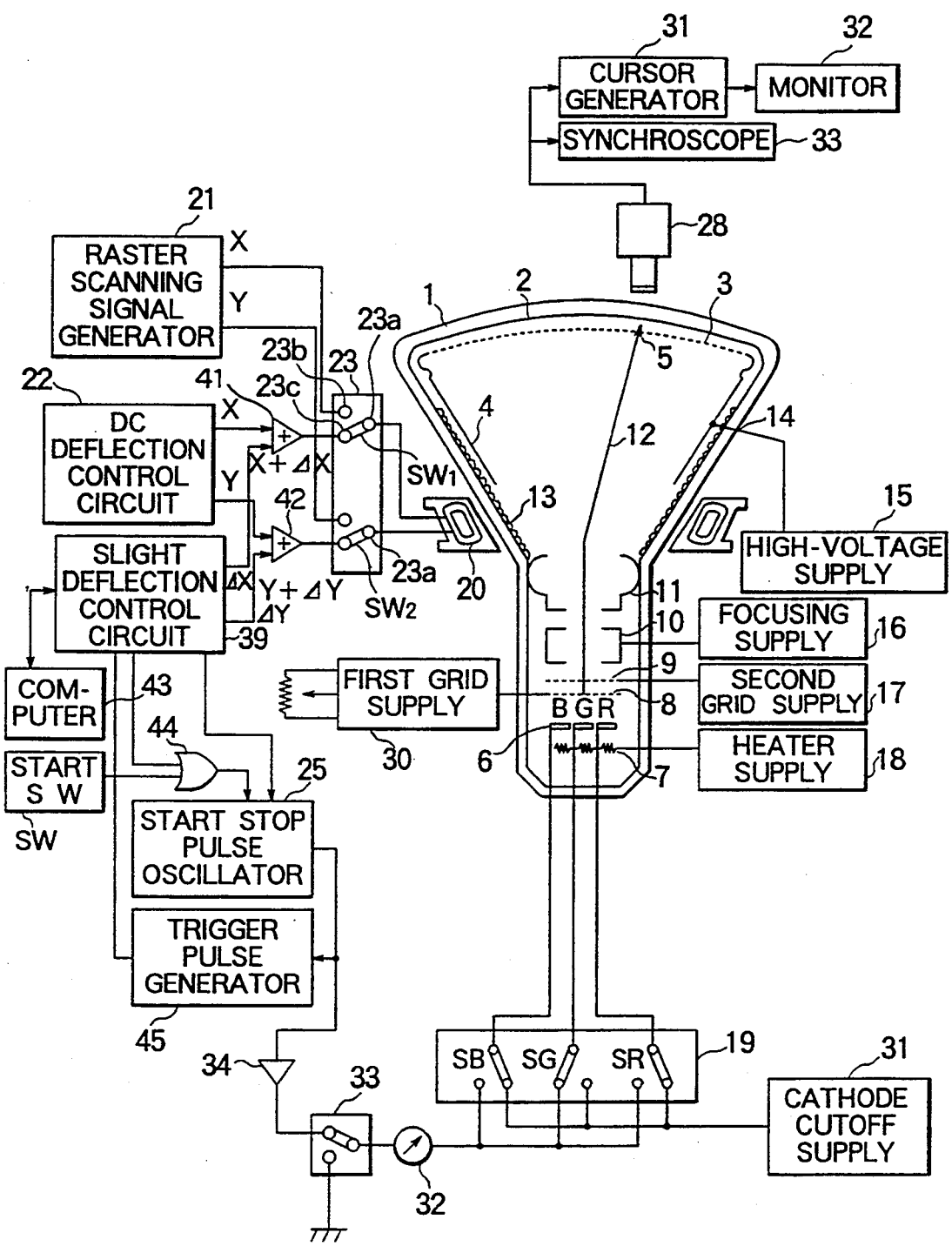
FIG. 17 is a constructional diagram of an apparatus representing Embodiment 5 of the present invention.

FIG. 17 is a constructional diagram of an apparatus representing Embodiment 5 of the present invention. Embodiment 5 has a more specific arrangement for removal of a large foreign matter than Embodiment 4.

In Embodiment 5, two sets of switches $SW_1$ and $SW_2$ are inserted in the switching circuit 23. The switches $SW_1$ and $SW_2$ have contacts 23a connected to the deflection coil 20, contacts 23b connected to output terminals X and Y of the raster scanning signal generator 21 respectively, and contacts 23c connected to the analog adder amplifier 41 or 42. The contacts 23a can be connected selectively to the contacts 23b or 23c.

One input terminal of the analog voltage adder amplifier 41 is connected to an output terminal of the dc deflection control circuit 22, and the other input terminal thereof is connected to an output terminal of the slight deflection control circuit 39. One input terminal of the analog voltage adder amplifier 42 is connected to an output terminal of the dc deflection control circuit 22, and the other input terminal thereof is connected to an output terminal of the slight deflection control circuit 39.

The pulse oscillator 25 inputs a signal sent from the slight deflection control circuit 39 through the stop terminal thereof, and also inputs an OR signal, in which a signal sent from a start switch SW and a signal produced by delaying a positive trigger pulse the slight deflection control circuit 39 provides are ORed by an OR gate 44, through the start terminal thereof. When inputting a positive pulse through the start terminal, the pulse oscillator 25 starts oscillation. When inputting a signal through the stop terminal, the pulse oscillator 25 stops oscillation. A pulse signal oscillated by the pulse oscillator 25 is fed to the cathodes 6 via the cathode amplifier 34, select switch 33, beam current monitor 32, and cathode switching circuit 19, and to a trigger pulse generator 45.

The trigger pulse generator 45 counts pulses fed by the pulse oscillator 25. When the count reaches a specified value, the trigger pulse generator 45 feeds a trigger signal to the slight deflection control circuit 39.

The slight deflection control circuit 39, which has a memory, transfers data to or from a computer 43, and stores slight deflection voltage data $D_X$ and $D_Y$ sent from the computer 43 in the memory. The slight deflection control circuit 39 counts positive trigger pulses fed by the trigger pulse generator 45, outputs two kinds of slight deflection voltages $\Delta X$ and $\Delta Y$ to the analog voltage adder amplifiers 41 and 42 according to the count value.

Figure 18:
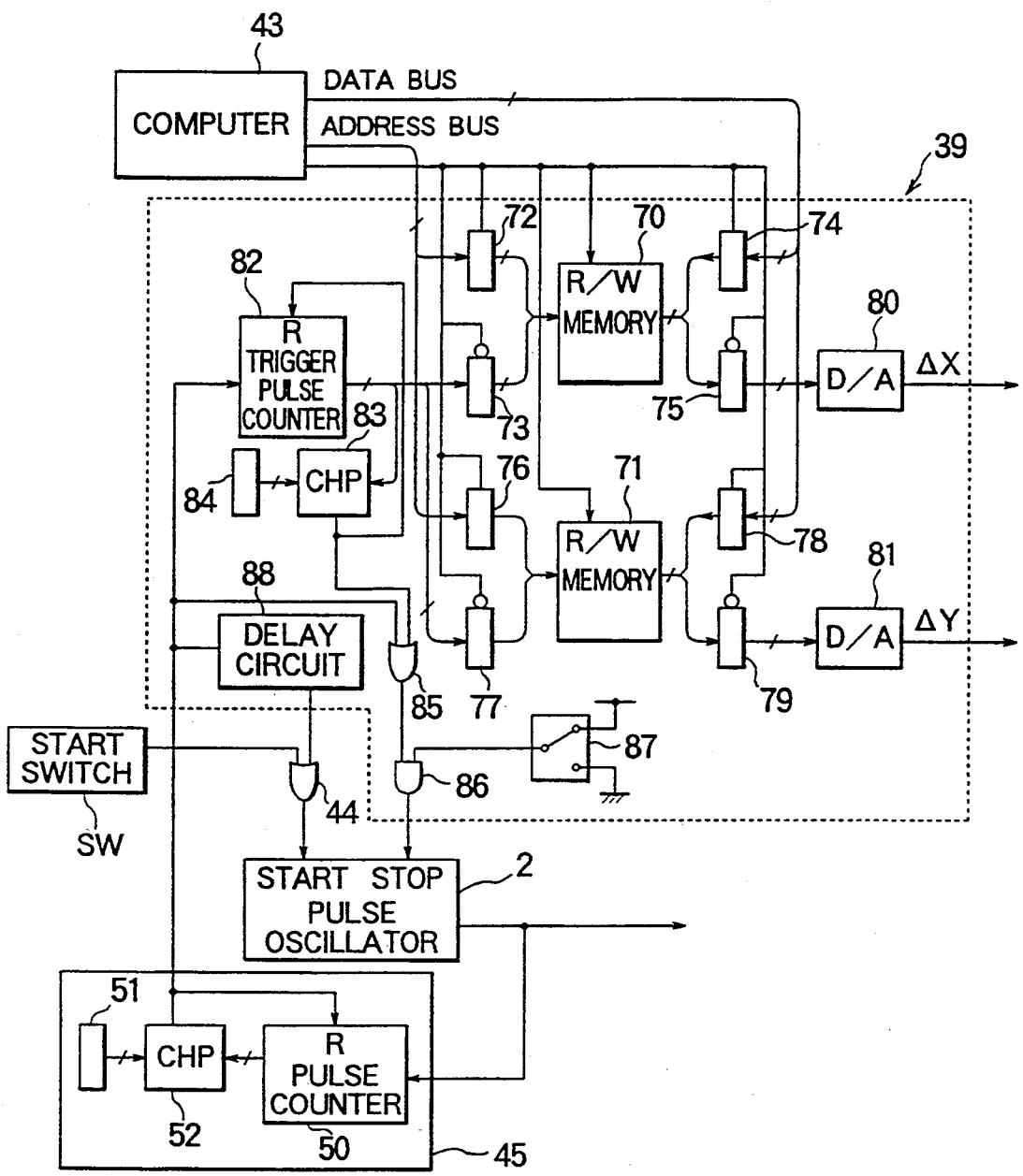
FIG. 18 is block diagram showing the detailed circuitry of a trigger pulse generator and a slight deflection control circuit included in the constructional diagram of the apparatus of Embodiment 5 of the present invention.

FIG. 18 is a block diagram showing a more specific circuitry of the slight deflection control circuit 39 and trigger pulse generator 45 shown in FIG. 17.

The trigger pulse generator 45 includes a pulse counter 50, a digital switch 51, and a comparator 52. The pulse counter 50 counts pulses fed by the pulse oscillator 25. The comparator 52 then compares the count value with a set pulse value fed by the digital switch 51. If these data agree with each other, a positive trigger pulse is generated and the pulse counter 50 is reset. The trigger pulse is output to the trigger pulse counter 82, OR gate 85, and delay circuit 88 in the slight deflection control circuit 39.

The slight deflection control circuit 39 has memories 70 and 71. The memories 70 and 71 are connected to the computer 43 over an address bus via bus drivers 72 and 76, and over a data bus via bus drivers 74 and ? 8. The memories 70 and 71 are also connected to a trigger pulse counter 82 over a data bus via bus drivers 73 and 77, and to digital-analog converters 80 and 81 over a data bus via bus drivers 75 and 79.

The computer 43 is connected to the memories 70 and 71 and to the bus drivers 72 to 79 over control signal lines. The timing of transferring data and other timing are controlled over the data buses.

83 denotes a comparator of the slight deflection control circuit 39. The comparator 83 compares each of pulses fed by the trigger pulse counter 82 with a set count value fed by the digital switch 84. If the two data agree with each other, the trigger pulse counter 82 is reset and a positive trigger signal is output to one input terminal of an OR gate 85. When inputting a positive trigger pulse from either the comparator 83 or 52, the OR gate 85 outputs a positive signal to an AND gate 86.

The other input terminal of the AND gate 86 is provided with a voltage fed by a constant voltage supply via a switch 87 or with a ground voltage. When provided with a constant voltage, the AND gate 86 outputs a positive signal to the stop terminal of the pulse oscillator. With the positive signal, the pulse oscillator 25 stops oscillation.

The delay circuit 88 delays a positive trigger pulse signal fed by the comparator 52 and outputs the delayed signal to the OR gate 44. When inputting a signal from the start switch SW or delay circuit 88, the OR gate 44 outputs a positive signal to the start terminal of the pulse oscillator 25.

Figures 19A, 19B:
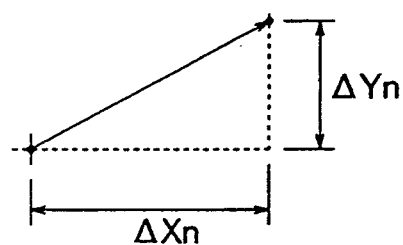
FIGS. 19a and 19b are conceptual diagrams showing the structures of data contained in memories in the slight deflection control circuit in Embodiment 5 of the present invention.

The computer 43 puts slight deflection data in areas associated with addresses in the memories 70 and 71. The slight deflection data are thus stored in the memories 70 and 71. FIG. 19a is a conceptual diagram showing the contents of data existent in the memories 70 and 71. The memory 70 contains data 0, $DX_1$, $DX_2$, etc., $DX_N$ in areas associated with addresses 0, 1, 2, etc., N, while the memory 71 contains data 0 $DY_1$, $DY_2$, etc., $DY_N$.

For example, when data $DX_N$ is read from the memory 70 and data $DY_N$ is read from the memory 71, a quantity of slight voltage displacement ($\Delta X_n$, $\Delta Y_n$) shown in FIG. 19b is added to a quantity of main deflection voltage, and then applied to the deflection coil 20.

The arrangement is made such that a larger quantity of the slight voltage displacement to be set can be obtained when the data $DX_2$, $DY_2$ are read than when the data $DX_1$, $DY_1$ are read and that a further larger quantity of the slight voltage displacement to be sent can be obtained when the data $DX_N$, $DY_N$ are read than when the data $DX_2$, $DY_2$ are read.

Next, the operation of Embodiment 5 will be described in conjunction with the timing chart of FIG. 20.

When an electron beam is aligned with a foreign matter, the select switch 87 is set to a ground potential and thus the stop terminal of the pulse oscillator 25 is set to a logical 0 via the AND gate 86. This enables pulses to oscillate sequentially.

As for the parameters for pulse output at this time, the pulse voltage level (equivalent to a quantity of beam current) is the same as that for foreign matter removal which will be done later, while the pulse duty factor is changed from that for foreign matter removal. When alignment of an electron beam with a foreign matter under these parameters is completed, the start switch SW is turned off temporarily to stop pulse oscillation.

For foreign matter removal, the pulse duty factor is adjusted so that the pulse oscillator 25 can be controlled with a signal sent from an external unit via the AND gate by operating the select switch 87.

First, the start switch SW is turned on, and thus a pulse oscillator start signal SA shown in FIG. 20a is applied to the start terminal of the pulse oscillator 25 via the OR gate 44. The pulse oscillator 25 then outputs a pulse train signal SB shown in FIG. 20b. At this stage, the address indicators of the first memory 70 and second memory 71 indicate zero. Data 0 ($\Delta X_0$, $\Delta Y_0$, where $\Delta X_0 = \Delta Y_0 = 0$) shown in FIG. 19a are read from the memories 70 and 71. The quantity of slight voltage displacement is set to zero. Thus, a deflection position, or a position to which a beam has been deflected, at the termination of alignment is held unchanged.

When the count of pulses contained in a pulse train reaches a value n set using the digital switch 51, the trigger pulse generator 45 generates a trigger pulse signal SC shown in FIG. 20c. With the trigger pulse signal SC, the address indicators of the first memory 70 and second memory 71 are incremented to 1 by the trigger pulse counter 82. Quantities of displacement $DX_1$ and $DY_1$ are read from the first memory 70 and second memory 71 respectively. The analog voltage adder 41 or 42 adds the associated quantity of slight voltage displacement ($\Delta X_1$, $\Delta Y_1$) to a quantity of main deflection voltage sent from the dc deflection circuit 22, and then applies the sum total to the deflection coil 20.

The trigger pulse signal SC is input to the stop terminal of the pulse oscillator 25 via the OR gate 85, thus stopping oscillation. After a very short delay time tc in FIG. 20 specified by the delay circuit 88 has elapsed, the pulse oscillator 25 restarts oscillation.

Thus, after a specified number of pulses are oscillated (a beam is irradiated intermittently) at a specified deflection position, pulse oscillation is suspended. The beam is moved to the next slight deflection position. After a very short delay time has elapsed, pulse oscillation is restarted. This procedure is repeated sequentially. When the number of repetition has reached the frequency N set using the digital switch 84, the intermittent irradiation of a beam due to slight deflection is completed.

Embodiment 6

In the methods of Embodiments 1 to 5, when the electron beam 12 is aligned with the foreign matter 5, the voltage of the focusing supply 16 is regulated so that the radiant circuit HC on the fluorescent screen 2 will always have a specified diameter. With the voltage of the focusing supply 16 constant, if the radiant diameter varies depending on the position on a tube surface, the pulse width may be changed accordingly.

Assuming that the radiant diameter is $D_1$ in the center of a tube surface and $D_2$ at ends (normally $D_1 \leq D_2$), if the parameters for pulsed irradiation of the electron beam 12 for removing a foreign matter from the center of a tube surface are a beam current $I_{b1}$ and a pulse width $W_{p1}$, a beam current $I_{b2}$ and a pulse width $W_{p2}$ at the ends are set as follows:

Beam current $I_{b2} = I_{b1}$,

Pulse width $W_{p2} = (D_2/D_1)^2 \cdot W_{p1}$

This is intended to provide the same number of irradiated electrons per pulse both in the center of a tube surface and at the ends thereof.

The above pulse width control is achieved by adjusting the parameters for pulse output by the pulse oscillator 25.

Embodiment 7

Figure 21:
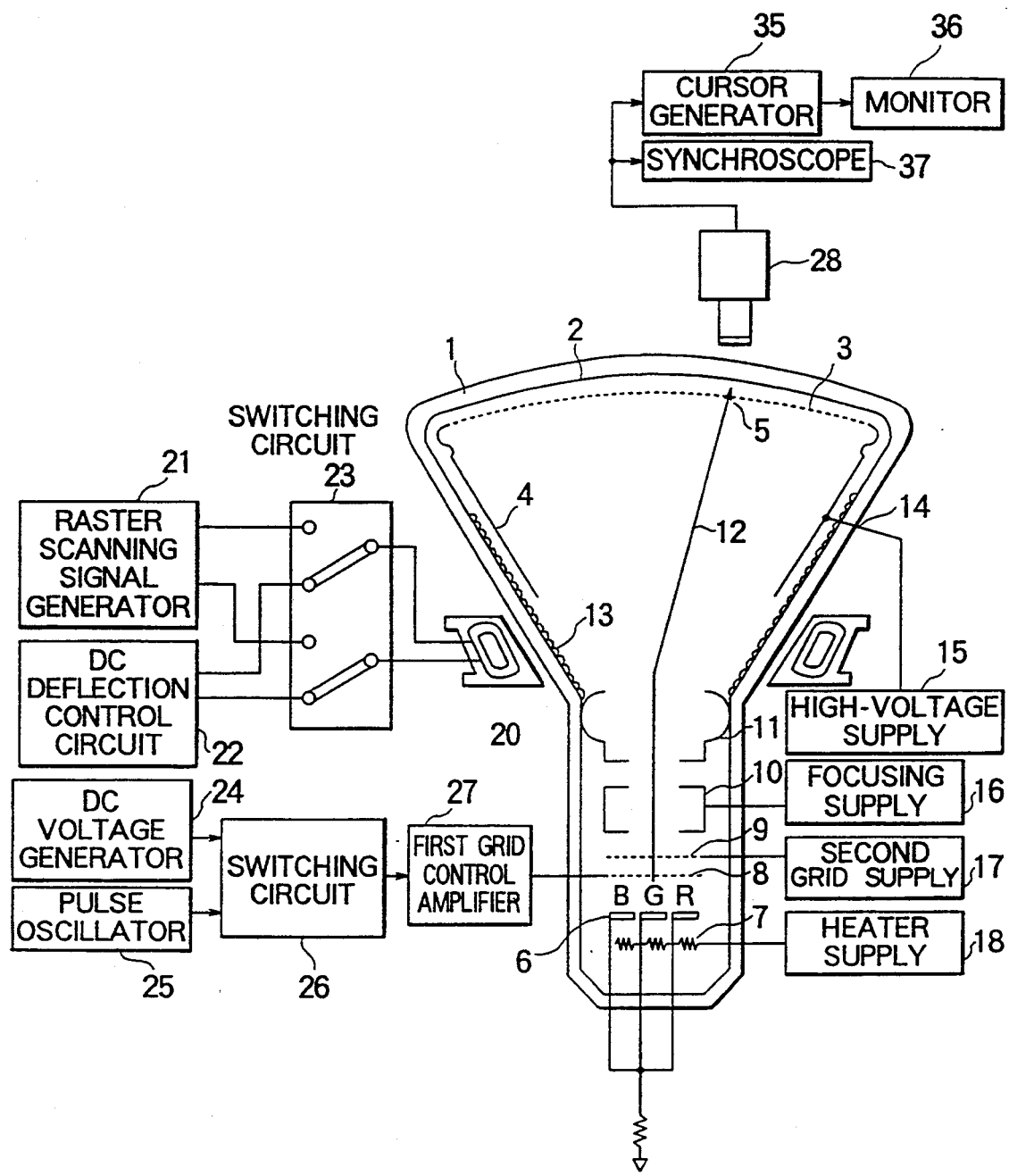
FIG. 21 is a constructional diagram of an apparatus representing Embodiment 7 of the present invention.

In the arrangements of Embodiments 1 to 6, the foreign matter 5 is removed using a monochrome (for example, green) beam. Beams of three colors (red, green, and blue) may be used simultaneously. The method of using three color beams is implemented in Embodiment 7. FIG. 21 shows a construction of an apparatus representing Embodiment 7. The cathode switching circuit 19 in the construction of FIG. 1 is excluded so as to actuate three cathodes 6 simultaneously.

In this embodiment, a value of a beam current provided by each cathode 6 is one-third of that of a monochrome beam in Embodiments 1 to 6. The instant the foreign matter 5 is removed, even if the electron beam 12 passes through a hole of the shadow mask 3 and reaches the fluorescent screen 2, an adverse effect of thermal denaturation to phosphors can be alleviated greatly.

Results of a comparison test

The drive circuit in Embodiment 2 (cathode pulsed drive method) or Embodiment 3 (first grid pulsed drive method) was added to an actual television drive circuit, and a beam current which is higher by nearly one digit than that in a conventional method was irradiated intermittently. As a result, 362 out of 602 tubes to which the beam current was irradiated were rescued. It was confirmed that the foreign matter removal ratio improved by about 60%.

What is referred to as the foreign matter removal ratio is a ratio of rescued tubes from which foreign matters could be removed to the total number of tubes to which the beam is irradiated.

If a foreign matter is an electrically insulating material such as a glass, the trajectory of an electron beam which is charged negatively during raster scanning and passes through the side of the foreign matter is bent due to a Coulomb force of restitution and irradiated to phosphors of other colors. Areas surrounding a black shadow on a tube surface then radiate in other colors. A considerable number of foreign matters of this kind (glasses) radiating in other colors in tube surfaces, though not all of them, could be removed.

Furthermore, the brightness levels of phosphors at the positions from which foreign matters were removed were measured using video signals the ITV camera outputs. As a result, it was confirmed that the brightness levels were unchanged from those before irradiation.

In the conventional method, under the restrictions for not placing thermally adverse effects on a mask and phosphors, the diameter of a beam was reduced to about 1 to 0.7 mm on a tube surface and continuous irradiation was performed at intervals of 10 sec with a beam current 40 uA. As a result, the foreign matter removal ratio was about 30%. foreign matters that were not removed are materials having high fusion points; such as, graphite conducting coat (carbonaceous material), glasses, and irons.

In the first invention, since an electron beam with a high current density is irradiated intermittently to a foreign matter, even foreign matters with high fusion points, which cannot be removed using the conventional continuous irradiation method, can be removed effectively without thermal deformation of a shadow mask or thermal damage to phosphors.

In the second invention, the incorporation of a means for inching the intermittent irradiation point of an electron beam enables effective removal of even large foreign matters.

What is claimed is:

1. A method for removing foreign matters from a cathode-ray tube, wherein:
   while an electron beam is being scanned all over a shadow mask of a cathode-ray tube using an electron gun of the cathode-ray tube itself, the radiant state of a fluorescent screen is observed from outside the cathode-ray tube;
   the observation data is analyzed to detect the presence or absence, and position of a foreign matter adhering to said shadow mask;
   a spot-like electron beam is deflected to align with the foreign matter; and then
   the electron beam is irradiated intermittently to remove the foreign matter.

2. A method for removing foreign matters from a cathode-ray tube according to claim 1, wherein a spot-like electron beam is irradiated in the form of pulses so as to align with a foreign matter; and
   as for the parameters for pulse output, the quantity of beam current is the same as that for foreign matter removal and the pulse duty factory is changed from that for foreign matter removal.

3. A method for removing foreign matters from a cathode-ray tube according to claim 1, wherein when a spot-like electron beam is aligned with a foreign matter, the size of a radiant area of said electron beam on a fluorescent screen is made constant by regulating a focusing voltage of said electron beam.

4. A method for removing foreign matters from a cathode-ray tube according to claim 1, wherein when the focusing voltage of said electron beam for aligning a spot-like electron beam with a foreign matter is set to a specified value, if the size of a radiant area of said electron beam on a fluorescent screen varies, the pulse duty factor for foreign matter removal is changed accordingly.

5. A method for removing foreign matters from a cathode-ray tube according to claim 1, wherein the quantity of irradiation energy carried by an electron beam per unit area or unit time is identical to or smaller than a maximum quantity of irradiation energy per unit area or unit time causing neither thermal deformation of a mask nor damage to phosphors during continuous irradiation of said electron beam.

6. A method for removing foreign matters from a cathode-ray tube according to claim 1, wherein when a foreign matter is removed, the intermittent irradiation point of an electron beam is inched in the vicinity of a foreign matter with the foreign matter as a center.

7. A method for removing foreign matters from a cathode-ray tube according to claim 1, wherein electron beams associated with three colors of red, green, and blue are used.

8. A method for removing foreign matters from a cathode-ray tube according to claim 1, wherein after a foreign matter is removed, the entire screen is scanned to produce a raster, an ITV camera is used to produce an enlarged image of the fluorescent screen, the level of a video signal provided by the ITV camera is measured to detect a change in brightness of phosphors at a position corresponding to the area from which a foreign matter is removed.

9. An apparatus for removing foreign matters from a cathode-ray tube, comprising:
   a means for scanning an electron beam over a tube surface so as to produce a raster;
   a means for detecting the position of a foreign matter adhering to a shadow mask by checking the radiant state of a fluorescent screen on the tube surface;
   a means for converging an electron beam spot to a specified diameter;
   a means for controlling the deflection position of a spot-like electron beam;
   a means for turning on and off an electron beam so as to achieve intermittent irradiation; and
   a means for inching the intermittent irradiation point of an electron beam discretely.

* * * * *